US012694711B2

(12) United States Patent
Baszucki et al.

(10) Patent No.: US 12,694,711 B2
(45) Date of Patent: Jul. 28, 2026

(54) CROSS-DEVICE COMMUNICATION WITH ADAPTIVE AVATAR INTERACTION

(71) Applicant: Roblox Corporation, San Mateo, CA (US)

(72) Inventors: David B. Baszucki, Portola Valley, CA (US); Garima Sinha, San Francisco, CA (US); Claus Christopher Moberg, Redwood City, CA (US); Raj Bhatia, San Mateo, CA (US); Kiran Bhat, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 4 days.

(21) Appl. No.: 18/828,752

(22) Filed: Sep. 9, 2024

(65) Prior Publication Data

US 2025/0086873 A1     Mar. 13, 2025

Related U.S. Application Data

(60) Provisional application No. 63/537,066, filed on Sep. 7, 2023.

(51) Int. Cl.
*G06T 13/40* (2011.01)
*G06F 3/01* (2006.01)
(Continued)

(52) U.S. Cl.
CPC .............. *G06T 13/40* (2013.01); *G06F 3/012* (2013.01); *G06Q 30/0643* (2013.01); *G06T 7/73* (2017.01);
(Continued)

(58) Field of Classification Search
CPC ......... G06T 13/40; G06T 7/73; G06T 13/205; G06T 15/20; G06T 19/006;
(Continued)

(56) References Cited

U.S. PATENT DOCUMENTS 12,073,530 B1 * 8/2024 Ng-Thow-Hing .... G06T 19/006
2021/0042979 A1 * 2/2021 Ballagas .............. G02B 27/017
(Continued)

OTHER PUBLICATIONS

"FMOD—Effects Reference", Firelight Technologies Pty Ltd., https://www.fmod.com/docs/2.00/api/effects-reference.html (accessed Nov. 8, 2024), 2021, 35 pages.

*Primary Examiner* — Adam R. Giesy
(74) *Attorney, Agent, or Firm* — IP Spring

(57) ABSTRACT

Various implementations relate to methods, systems and computer readable media to provide cross-device communication with adaptive avatar interaction. According to one aspect, a computer-implemented method includes receiving communication inputs from a first device, determining facial landmarks and head orientation of the first user, and generating an animated 3D avatar based on the inputs. A virtual camera position is adjusted according to the head orientation. The computer-implemented method further receives additional communication inputs from a second device with enhanced features, modifies the avatar accordingly, and provides the enhanced animation to the second device. Various implementations allow for different viewing modes, including picture-in-picture (PIP), side-by-side, and cinematic views, to adapt the experience across multiple devices such as virtual reality (VR) headsets, augmented reality (AR) devices, mobile phones, and desktop computers.

20 Claims, 11 Drawing Sheets

(51) Int. Cl.

| | |
|---|---|
| *G06Q 30/0601* | (2023.01) |
| *G06T 7/73* | (2017.01) |
| *G06T 13/20* | (2011.01) |
| *G06T 15/20* | (2011.01) |
| *G06T 19/00* | (2011.01) |
| *G06V 40/16* | (2022.01) |

(52) U.S. Cl.
CPC ............ *G06T 13/205* (2013.01); *G06T 15/20* (2013.01); *G06T 19/006* (2013.01); *G06V 40/171* (2022.01); *G06T 2207/10016* (2013.01); *G06T 2207/30201* (2013.01); *G06T 2215/16* (2013.01); *G06T 2219/024* (2013.01)

(58) Field of Classification Search
CPC . G06T 2207/10016; G06T 2207/30201; G06T 2215/16; G06T 2219/024; G06F 3/012; G06Q 30/0643; G06Q 10/10; G06Q 50/01; G06V 40/171; H04N 7/157
See application file for complete search history.

(56) References Cited

U.S. PATENT DOCUMENTS

2023/0410378 A1* 12/2023 Karmi .................. G06V 40/174
2024/0104819 A1* 3/2024 Chand ..................... H04N 7/15

\* cited by examiner

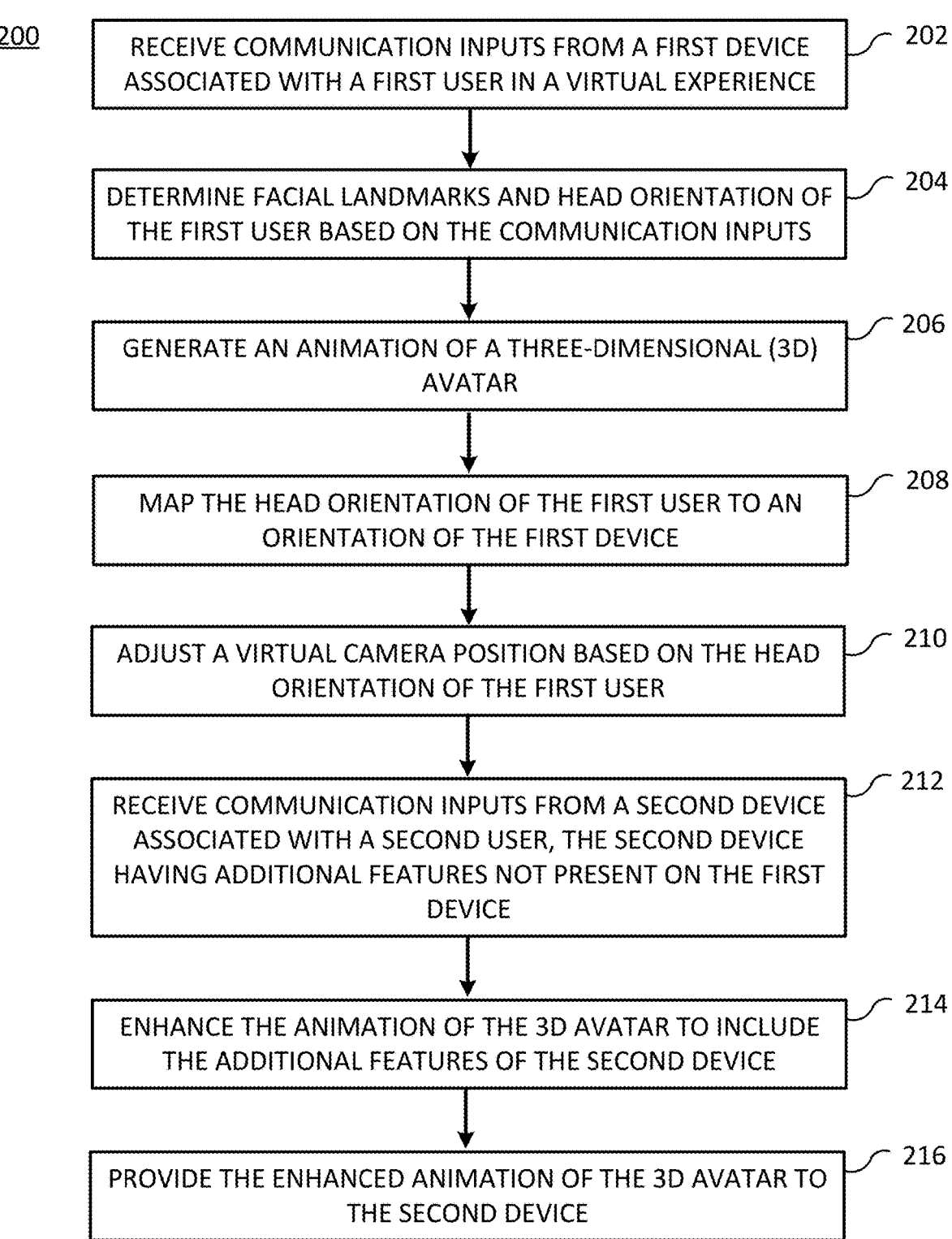

200

RECEIVE COMMUNICATION INPUTS FROM A FIRST DEVICE ASSOCIATED WITH A FIRST USER IN A VIRTUAL EXPERIENCE — 202

DETERMINE FACIAL LANDMARKS AND HEAD ORIENTATION OF THE FIRST USER BASED ON THE COMMUNICATION INPUTS — 204

GENERATE AN ANIMATION OF A THREE-DIMENSIONAL (3D) AVATAR — 206

MAP THE HEAD ORIENTATION OF THE FIRST USER TO AN ORIENTATION OF THE FIRST DEVICE — 208

ADJUST A VIRTUAL CAMERA POSITION BASED ON THE HEAD ORIENTATION OF THE FIRST USER — 210

RECEIVE COMMUNICATION INPUTS FROM A SECOND DEVICE ASSOCIATED WITH A SECOND USER, THE SECOND DEVICE HAVING ADDITIONAL FEATURES NOT PRESENT ON THE FIRST DEVICE — 212

ENHANCE THE ANIMATION OF THE 3D AVATAR TO INCLUDE THE ADDITIONAL FEATURES OF THE SECOND DEVICE — 214

PROVIDE THE ENHANCED ANIMATION OF THE 3D AVATAR TO THE SECOND DEVICE — 216

FIG. 2

902                    904
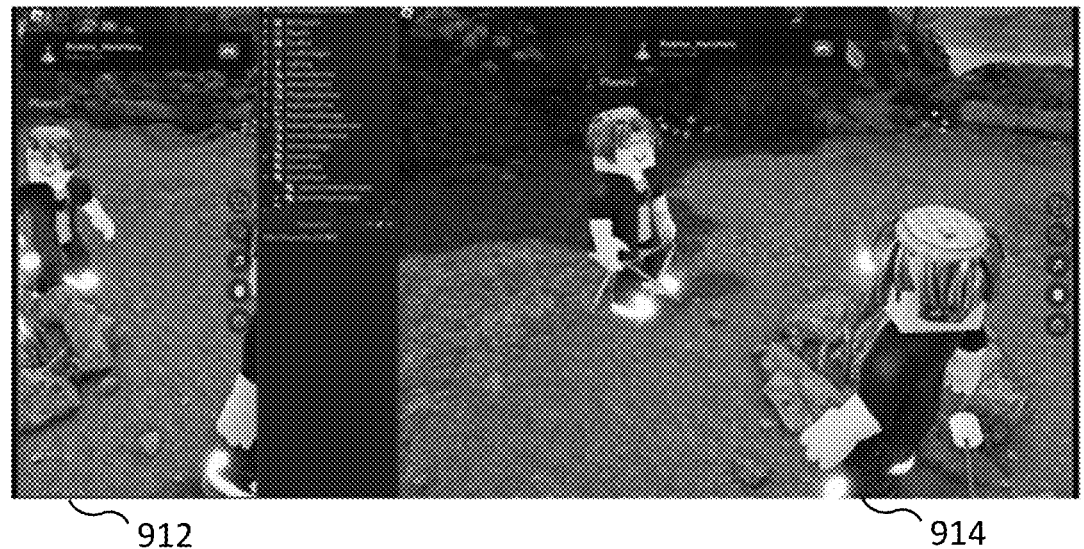
912                    914
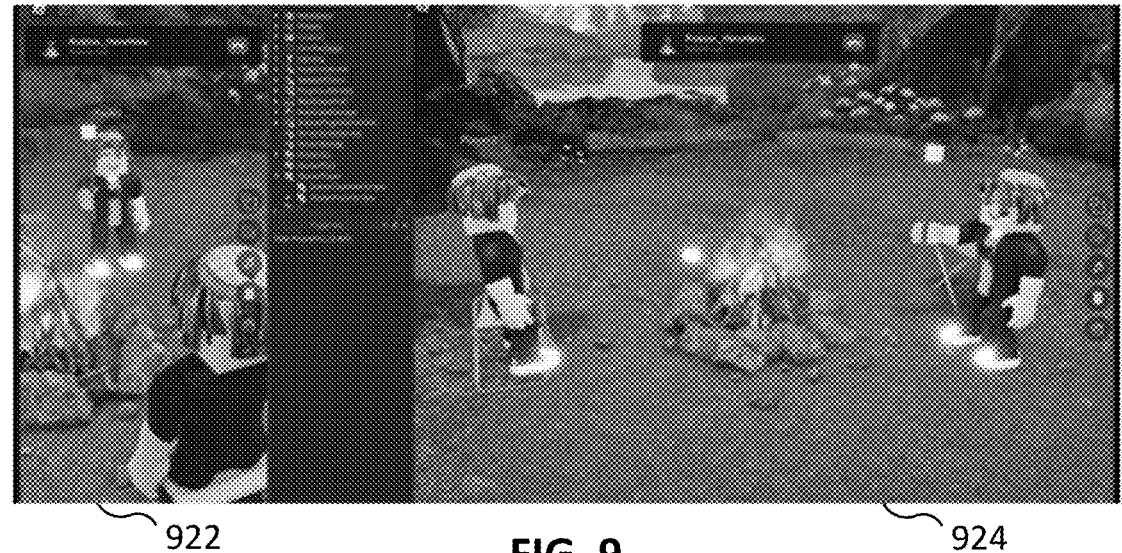
922                    924
FIG. 9

CROSS-DEVICE COMMUNICATION WITH ADAPTIVE AVATAR INTERACTION

CROSS-REFERENCE TO RELATED APPLICATIONS

This application claims priority under 35 U.S.C. § 119(e) to U.S. Provisional Patent Application No. 63/537,066, entitled "METAVERSE COLLABORATION SYSTEMS," filed on Sep. 7, 2023, the contents of which are hereby incorporated by reference herein in its entirety.

TECHNICAL FIELD

Implementations relate generally to cross-device communication technologies, and more specifically but not exclusively, relate to methods, systems, and computer readable media for rendering and enhancing three-dimensional (3D) avatars based on communication inputs from devices with varying capabilities.

BACKGROUND

In modern communication systems, users frequently engage in conversations (e.g., text chat, audio chat, video chat, video chat where user avatars are depicted, and various combinations thereof) across a wide array of devices, including, e.g., smartphones, tablets, personal computers, virtual reality (VR) headsets, and augmented reality (AR) devices. The devices vary in terms of their input and output capabilities, with some providing basic audio or video communication and others enabling immersive 3D experiences. While the diverse communication platforms provide flexibility to users, they often present challenges when participants using different devices attempt to communicate seamlessly. The lack of compatibility across the devices can result in a reduced experience, where the interaction defaults to the lowest common denominator of the available technologies.

A significant challenge in cross-device communication is the inability to maintain and adjust the user experience when transitioning between devices. For example, a user who initiates a communication session on a smartphone may be limited to audio or video-only interactions, while another user on a VR headset has access to a fully immersive 3D environment. The disparity in capabilities often leads to communication sessions where the advanced features of devices like VR or AR headsets are underutilized or unavailable to participants on less-capable devices, such as those limited to 2D video feeds.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, systems, and computer-readable media for providing cross-device communication with adaptive avatar interaction.

According to one aspect, a computer-implemented method includes receiving communication inputs from a first device associated with a first user in a virtual experience, the communication inputs including at least a video input; determining facial landmarks and head orientation of the first user based on the communication inputs; generating an animation of a 3D avatar based on the facial landmarks and the head orientation of the first user; mapping the head orientation of the first user to an orientation of the first device based on one or more of roll, yaw, and pitch of the orientation of the first device; adjusting a virtual camera position based on the head orientation of the first user; receiving communication inputs from a second device associated with a second user in the virtual experience, the second device having additional features not present on the first device; enhancing the animation of the 3D avatar to include the additional features of the second device; and providing the enhanced animation of the 3D avatar to the second device.

In some implementations, the second device is a VR headset, and the additional features include VR-specific inputs and outputs.

In some implementations, the computer-implemented method includes receiving a request from the second device to switch from a VR mode to an augmented reality (AR) mode; and adjusting the animation of the 3D avatar and the virtual camera position based on the AR mode.

In some implementations, the communication inputs from the first device include audio input, and the computer-implemented method includes generating facial expressions and mouth movements for the 3D avatar based on the audio input.

In some implementations, adjusting the virtual camera position includes determining a position of shoulders of the first user in relation to the head orientation, and using the position of the shoulders of the first user to calculate a depth for the animation of the 3D avatar.

In some implementations, the second device is an AR headset, and the additional features comprise AR-specific functionality comprising at least rendering the 3D avatar in a real-world environment as viewed through the AR headset.

In some implementations, enhancing the animation of the 3D avatar for the second device includes adjusting an appearance and one or more movements of the 3D avatar based on device-specific features.

In some implementations, the enhanced animation of the 3D avatar includes a portion of a call in the virtual experience between the first user and the second user.

According to another aspect, a system includes one or more processors and memory coupled to the one or more processors storing instructions that, when executed by the one or more processors, cause the system to perform operations including: receiving communication inputs from a first device associated with a first user in a virtual experience, the communication inputs including at least a video input; determining facial landmarks and head orientation of the first user based on the communication inputs; generating an animation of a 3D avatar based on the facial landmarks and the head orientation of the first user; mapping the head orientation of the first user to an orientation of the first device based on one or more of roll, yaw, and pitch of the orientation of the first device; adjusting a virtual camera position based on the head orientation of the first user; receiving communication inputs from a second device associated with a second user in the virtual experience, the second device having additional features not present on the first device; enhancing the animation of the 3D avatar to include the additional features of the second device; and providing the enhanced animation of the 3D avatar to the second device.

In some implementations, the second device is a VR headset, and the additional features include VR-specific inputs and outputs.

In some implementations, the instructions cause the system to further perform operations including: receiving a request from the second device to switch from a VR mode to an augmented reality (AR) mode; and adjusting the animation of the 3D avatar and the virtual camera position based on the AR mode.

In some implementations, the communication inputs from the first device include audio input, and the instructions cause the system to further perform an operation including generating facial expressions and mouth movements for the 3D avatar based on the audio input.

In some implementations, adjusting the virtual camera position includes determining a position of shoulders of the first user in relation to the head orientation, and using the position of the shoulders of the first user to calculate a depth for the animation of the 3D avatar.

In some implementations, the second device is an AR headset, and the additional features comprise AR-specific functionality comprising at least rendering the 3D avatar in a real-world environment as viewed through the AR headset.

In some implementations, enhancing the animation of the 3D avatar for the second device includes adjusting an appearance and one or more movements of the 3D avatar based on device-specific features.

In some implementations, the enhanced animation of the 3D avatar includes a portion of a call in the virtual experience between the first user and the second user.

According to another aspect, a non-transitory computer-readable medium with instructions stored thereon is provided that, when executed by a processor, cause the processor to perform operations. The operations include: receiving communication inputs from a first device associated with a first user in a virtual experience, the communication inputs including at least a video input; determining facial landmarks and head orientation of the first user based on the communication inputs; generating an animation of a 3D avatar based on the facial landmarks and the head orientation of the first user; mapping the head orientation of the first user to an orientation of the first device based on one or more of roll, yaw, and pitch of the orientation of the first device; adjusting a virtual camera position based on the head orientation of the first user; receiving communication inputs from a second device associated with a second user in the virtual experience, the second device having additional features not present on the first device; enhancing the animation of the 3D avatar to include the additional features of the second device; and providing the enhanced animation of the 3D avatar to the second device.

In some implementations, the second device is a VR headset, and the additional features include VR-specific inputs and outputs.

In some implementations, the instructions further cause the processor to perform operations including: receiving a request from the second device to switch from a VR mode to an AR mode; and adjusting the animation of the 3D avatar and the virtual camera position based on the AR mode.

In some implementations, the communication inputs from the first device include audio input, and the instructions further cause the processor to perform an operation including generating facial expressions and mouth movements for the 3D avatar based on the audio input.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications, and all such modifications are within the scope of this disclosure.

BRIEF DESCRIPTION OF DRAWINGS

FIG. 2 is a flow diagram illustrating a method for cross-device communication with adaptive avatar interaction in a virtual experience, in accordance with some implementations.

FIG. 9 illustrates examples of different view modes on different devices for a call during a virtual experience, in accordance with some implementations.

DETAILED DESCRIPTION

Figure 1:
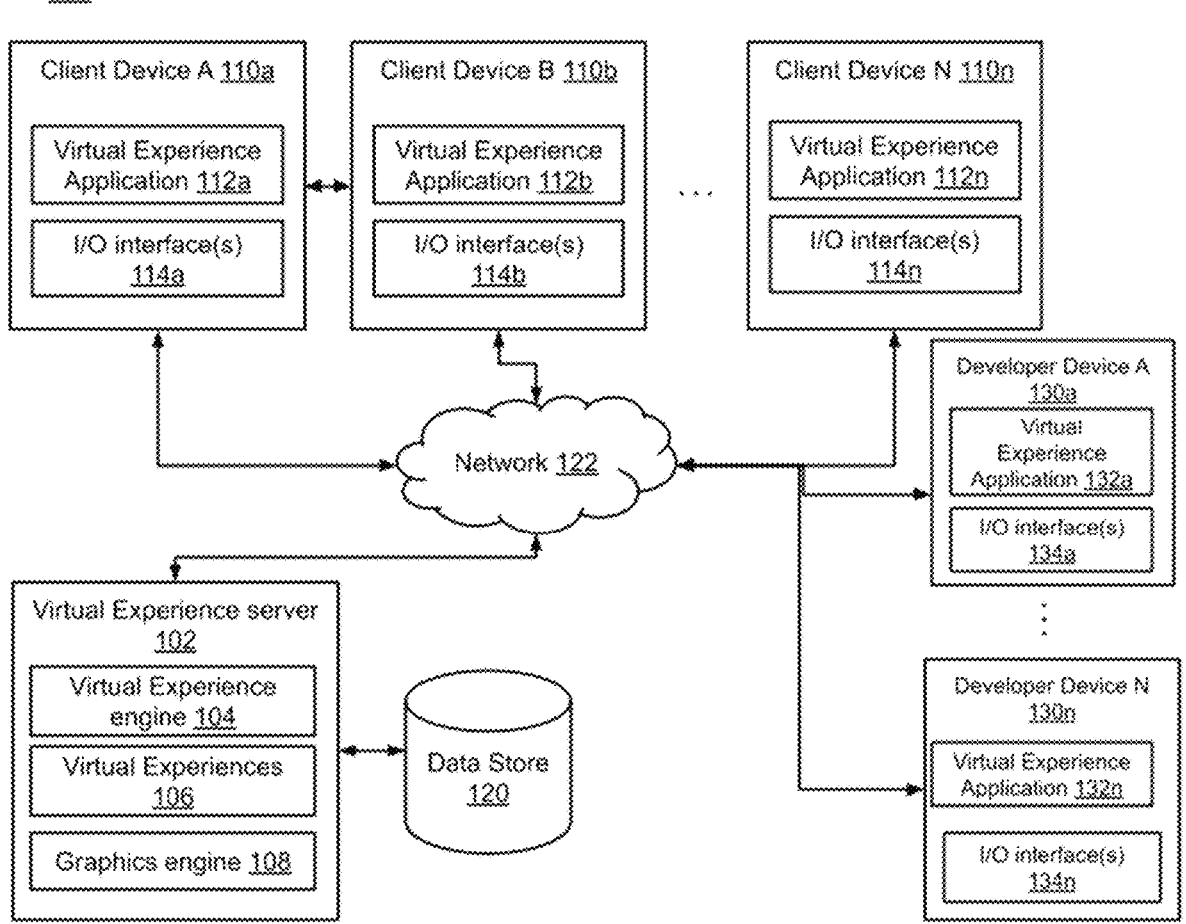
FIG. 1 is a diagram of an example system architecture that can be used for cross-device communication with adaptive avatar interaction in a virtual experience, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

One or more implementations described herein relate to enabling cross-device communication and collaboration within virtual experiences. The approach enables interaction between users that participate in a virtual experience while accessing a virtual experience platform from any of different devices such as mobile phones, desktop computers, VR headsets, AR devices, other wearable or portable devices, or other types of computing devices. Various modes of communication can be supported, including, e.g., voice (audio), video (including video depicting avatar animations), and text chat, and combinations thereof along with real-time or near-real-time avatar-based interactions. By providing adaptable calling features on the virtual experience platform, users with devices of varying capabilities can participate in virtual interactions without the need for manual configuration or interruption to a call.

In various implementations, 3D avatars (associated with respective users) can be generated and provided in a virtual experience based on communication inputs, such as facial landmarks and head orientation, captured from the device of a user. A virtual camera position is adjusted to align with the head orientation of the user, providing an immersive experience. Furthermore, additional inputs can be received from more feature-rich devices, such as VR or AR headsets, and dynamically enhance the animation of the avatar to reflect those additional features. This ensures that users on more capable devices experience a richer interaction, while still allowing those on less advanced devices, like mobile phones, to participate.

In some implementations, the challenge of maintaining communication consistency when users transition between different devices or modes during a session is addressed. For example, a user may begin a virtual call on a mobile phone and later switch to a VR headset while on the same virtual call. The avatar of the user, camera views, and other communication features are transitioned without dropping connections or requiring the user to manually adjust settings. This cross-device compatibility allows for fluid transitions and continuous interaction, regardless of changes in the device being used.

In various implementations, features such as picture-in-picture (PIP) viewing, side-by-side avatar interactions, and cinematic modes can be provided to present multiple participants within a single virtual space (e.g., virtual experience, dedicated calling/meeting spaces within the virtual experience platform, etc.). This enables users to customize the call experience to suit their preferences, whether they are engaged in one-on-one communication or participating in group interactions.

It is noted that any use of user and/or developer data for any purpose is specifically with permission from the user, in accordance with applicable regulations, and can be turned off by the user. A user can choose what data to permit for such use. User data is stored securely and in compliance with rules and laws. Furthermore, data collection is not performed in certain geographic locations, for certain user categories (e.g., based on age or other demographic), is temporary (data are discarded after a period of time), and is stored securely even when used temporarily. Moreover, user data are not shared with third parties. Even further, some data may be anonymized, aggregated across users, or otherwise modified so that a specific user identity cannot be determined.

In some implementations, users are additionally enabled to conduct calls within a virtual experience, where participants are represented by animated avatars (e.g., 3D avatars). For example, a user can initiate a call while immersed in a virtual experience, and if the recipient accepts the call, their avatar is introduced into the same or another virtual space. As the call progresses, both avatars interact with each other as well as the virtual surroundings, with animations synchronized to the speech and movements of the users, offering a more engaging and interactive communication experience.

In various implementations, both one-on-one and group communication are supported within virtual experiences. In a one-on-one setting, the avatars may engage privately in a designated space, with adjustments made to the environment based on their actions and movements. For group calls, multiple users can join the same virtual space, each represented by avatars that interact in real-time or near-real-time. This feature enables collaborative or social interactions within virtual worlds, enhancing engagement through visually dynamic, avatar-driven interactions.

In some implementations, native phone or communication applications are leveraged to facilitate calls within virtual experiences, with application programming interfaces (APIs) providing integration. The APIs may provide access to various call/communication-related features provided by a virtual experience platform. The APIs can be utilized by developers (e.g., that design and provide virtual experiences on the platform) and/or users (that participate in virtual experiences) to tailor the communication experience, controlling elements such as avatar animations, camera views, and the use of voice, video, text, and any combination thereof.

In various implementations, immersive communication experiences are created, where users interact as if physically present in the virtual world (of the virtual experience), viewing the space of the virtual experience through the perspective of their avatars. This immersion ensures that both avatars remain in view during movement within the virtual space, maintaining continuity in the interaction. Additionally, the platform provides features that give users the ability to transition to different virtual locations or change camera perspectives without interrupting the call. This dynamic interaction offers a more engaging alternative to traditional video conferencing, allowing users to be fully immersed in the communication experience.

In some implementations, for those preferring a non-immersive experience, users can observe the virtual experience from a view where they are detached from direct avatar control. While not actively interacting with the virtual world, users can still participate in the call and view avatar interactions within the environment. This approach offers flexibility, enabling users to choose between fully immersive or observational communication experiences based on their preferences or device capabilities.

For the sake of generality, various implementations will be described herein in the context of a virtual experience or more simply "experience". It is understood that such virtual experience(s) may include immersive experiences in some contexts, and non-immersive experiences in other contexts.

Some technical advantages of one or more described features include communication being enabled across multiple devices with different capabilities, allowing users to participate in a virtual experience without being constrained by the limitations of their specific devices. The experience is automatically adjusted based on the capabilities of each device, improving user engagement and interaction across platforms, and for users with different device capabilities to participate together in a virtual experience and engage in communication.

Another technical advantage of some implementations is the ability to switch between different communication modes, such as virtual reality (VR) and augmented reality (AR), without disrupting the communication session. This ensures that users can continue their interaction even as they move between devices or environments.

Another technical advantage of some implementations is the mapping of a head orientation and facial expressions of a user to a 3D avatar, providing a more immersive and interactive communication experience. This can be achieved even if the device of the user lacks advanced sensors, ensuring high-quality avatar representation regardless of the device used.

Another technical advantage of some implementations is the capability to enhance communication outputs on more advanced devices, such as rendering additional features in VR or AR environments, while maintaining compatibility with less-capable devices.

FIG. 1 is a diagram of an example system architecture that can be used for cross-device communication with adaptive avatar interaction in a virtual experience. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online virtual experience server 102, data store 120, client devices 110a, 110b, and 110n (generally referred to as "client device(s) 110" herein), and developer devices 130a and 130n (generally referred to as "developer device(s) 130" herein). Virtual experience server 102, data store 120, client devices 110, and developer devices 130 are coupled via network 122. In some implementations, client device(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowchart shown in FIG. 2. In one or more additional or alternative implementations, the operations described below may be performed on one or more client devices 110, or one or more developer devices 130. In some implementations, where the operations are performed depends at least in part on computational resources, e.g., memory, processing power, or disk space. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may include multiple storage components (e.g., multiple drives or multiple databases) that may span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participants(s); accessories utilized by participants; etc.

In some implementations, online virtual experience server 102 may be a type of social network providing connections between users or a type of user-generated content system that enables users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations, a user may be represented as a single individual. Other implementations may include a user being an entity controlled by a set of users or an automated source. For example, a set of individual users federated as a community or group in a user-generated content system may be considered a user.

In some implementations, online virtual experience server 102 may be or include a virtual gaming server. For example, the gaming server may provide single-player or multiplayer games to a community of users that may access a "system" herein that includes online gaming server 102, data store 120, and client device 110 and/or may interact with virtual experiences using client devices 110 via network 122. In some implementations, virtual experiences (including virtual realms or worlds, virtual games, other computer-simulated environments) may be 2D virtual experiences, 3D virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in near-real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments", "virtual environments", or "virtual spaces" herein) where multiple environments may be linked. An example of a virtual environment may be a three-dimensional (3D) environment. The one or more environments of a virtual experience 106 may be collectively referred to as a "world" or "virtual experience world" or "gaming world" or "virtual world" or "virtual space" or "universe" herein. An example of a world may be a 3D world of a virtual experience 106. For example, a user may build a virtual environment that is linked to another virtual environment created by another user. A character (avatar) of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters (avatars), decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 meets a threshold number, the online virtual experience server 102 may perform one or more virtual experience engine functions that were performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For instance, the online virtual experience server 102 may perform one or more logical operations (e.g., using virtual experience engine 104) on the control instructions to generate experience instruction(s) for the client devices 110. In other instances, online virtual experience server 102 may pass one or more or the control instructions from one client device 110 to other client devices (e.g., from client device 110a to client device 110b) participating in the virtual experience 106. The client devices 110 may use the experience instructions and render the virtual experience for presentation on the displays of client devices 110.

In some implementations, the control instructions may refer to instructions that are indicative of actions of a character (i.e., avatar) of the user within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110b to client device 110n), where the other client device generates experience instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate an interaction of the user with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online virtual experience platform may provide users access to simplified 3D virtual object models that are represented by a mesh of a low polygon count, e.g., between about 20 and about 30 polygons.

In some implementations, the user may control the scale (e.g., height, width, or depth) of a character or the scale of components of a character. In some implementations, the user may control the proportions of a character (e.g., blocky, anatomical, etc.). It may be noted that is some implementations, a character may not include a character virtual experience object (e.g., body parts, etc.) but the user may control the character (without the character virtual experience object) to facilitate the interaction of the user with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a character of a user for view or use by other users of the online virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, animate or inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a character of a user can include a configuration of components, where the configuration and appearance of components and more generally the appearance of the character may be defined by character settings. In some implementations, the character settings of a character of a user may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual experience, etc.) served by a web server. In another example, the virtual experience application may be a native application (e.g., a mobile application, app, virtual experience program, or a gaming program) that is installed and executes local to client device 110 and enables users to interact with online virtual experience server 102. The virtual experience application may render, display, or present the content (e.g., a web page, a media viewer) to a user. In an implementation, the virtual experience application may include an embedded media player (e.g., a Flash® or HTML5 player) that is embedded in a web page.

According to some implementations, the virtual experience application may be an online virtual experience server application for users to build, create, edit, upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual experience, etc.) served by a web server. In another example, the virtual experience application may be a native application (e.g., a mobile application, app, virtual experience program, or a gaming program) that is installed and executes local to client device 110 and enables users to interact with online virtual experience server 102. The virtual experience application may render, display, or present the content (e.g., a web page, a media viewer) to a user. In an implementation, the virtual experience application may include an embedded media player (e.g., a Flash® or HTML5 player) that is embedded in a web page.

According to some implementations, the virtual experience application 132 may be an online virtual experience server application for users to build, create, edit, upload content to the online virtual experience server 102 as well as interact with online virtual experience server 102 (e.g., provide and/or engage in virtual experiences 106 hosted by online virtual experience server 102). As such, the virtual experience application may be provided to the client device (s) 110 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with credentials, a virtual experience developer may obtain access to virtual experience virtual objects, such as in-platform currency (e.g., virtual currency), avatars, special powers, accessories, which are owned by or associated with other users.

In general, functions described in one implementation as being performed by the online virtual experience server 102 can be performed by the client device(s) 110, or a server, in other implementations if appropriate. In addition, the functionality attributed to a particular component can be performed by different or multiple components operating together. The online virtual experience server 102 can be accessed as a service provided to other systems or devices through suitable application programming interfaces (hereinafter "APIs"), and thus is not limited to use in websites.

FIG. 2 is a flow diagram illustrating an example method 200 to provide cross-device communication with adaptive avatar interaction, in accordance with some implementations. In various implementations, the blocks shown in FIG. 2 and described below may be performed by any of the elements illustrated in FIG. 1, e.g., one or more of client devices 110 and/or virtual experience server 102. For example, in a distributed simulation, two or more client devices 110 may perform method 200, or at least one client device 110 and virtual experience server 102 may perform method 200. In some implementations, certain blocks of method 200 may be performed by a client device 110 and other blocks of method 200 may be performed by a virtual experience server 102. Method 200 begins at block 202.

At block 202, communication inputs are received from a first device associated with a first user in a virtual experience. The communication inputs include at least a video input. A communication input refers to any form of data or signal transmitted from the device that is used to represent the presence or actions of the user within the virtual experience. In various implementations, examples of communication inputs can include one or more of, e.g., video feeds, audio data, text-based input (e.g., keyboard input, speechto-text input), motion tracking data, or sensor inputs such as gyroscopic or accelerometer data (e.g., that capture device motion). The inputs provide information to generate or update the representation of the user within the virtual experience.

The term device refers to any hardware unit capable of transmitting communication inputs. A device may include, for example, mobile phones, tablets, desktop computers, VR headsets, AR headsets, or any other computing device with video, audio, or sensor capabilities. The device communicates over a network, providing user-specific data so the actions or appearance of the user within the virtual experience can be processed and rendered. In this context, the first device is the hardware unit associated with the first user, transmitting the relevant communication inputs for the virtual presence of the user.

A user in this context is an individual (or group of individuals, e.g., that are co-located and participating in a virtual experience, e.g., via a single device or a combination of devices) who is interacting with the virtual experience through the device. The actions of the user, such as, e.g., head movements, facial expressions, or spoken words, are captured by the device and transmitted as communication inputs. The inputs are processed to generate corresponding visual and auditory elements that represent the user within the virtual experience, such as animating a 3D avatar or adjusting virtual camera angles.

A virtual experience refers to any digital environment in which users can interact with other users or elements within that environment, often represented in a 3D space. Virtual experiences may include, for example, VR environments, AR-enhanced spaces, or traditional video-based communication platforms that incorporate interactive elements. Within this experience, users are represented by avatars or other visual indicators, and their actions within the experience are determined by the communication inputs received from their devices.

In some implementations, video input received from the first device is a primary communication input. Video input refers to the visual data captured by the camera of the device, which may include the face, body, or surrounding environment of the user. In various implementations, the video input is a continual feed, providing updates, or it may include discrete frames processed at specific intervals. This visual information forms the basis for generating an accurate representation of the appearance and movements of the user within the virtual experience. Block 202 is followed by block 204.

At block 204, facial landmarks and head orientation of the first user are determined based on the communication inputs. Facial landmarks refer to specific points on the face that can be identified and used to infer the geometry and structure of the face. In various implementations, the facial landmarks may include, but are not limited to, points around the eyes, nose, mouth, and jawline of a face (e.g., of a user associated with the first device from which communication inputs are received). The detection of the facial landmarks allows a mapping to be created of the facial features of the user, which can be used to generate an animated avatar or facilitate other forms of virtual representation.

In some implementations, detection of facial landmarks may be performed using various image processing or machine learning techniques designed to recognize specific features in the video input. For example, the video frames captured by the camera of the device may be analyzed, identifying areas of high contrast or specific shapes that correspond to facial features. The facial landmarks can be represented as a set of coordinates within a two-or three-dimensional space. In some implementations, static landmarks may be detected, such as the position of the eyes, as well as dynamic landmarks, such as the shape of the mouth or the degree of eyelid closure, which can change as the user speaks or moves.

Head orientation refers to the angular position of the head of the user in relation to a defined reference point, such as the camera or another point in the virtual environment. In some implementations, the determination of head orientation includes the spatial relationships between the detected facial landmarks being mapped. For example, the distance between the eyes and the position of the nose of the user can provide information about the tilt or angle of the head. By tracking the relationships across multiple frames of video input, changes in the head orientation of the user can be determined and the virtual representation can be updated accordingly. In some cases, additional sensors, such as gyroscopes or accelerometers in the device of the user, may provide supplemental data to assist in determining head orientation with greater accuracy. Block 204 may be followed by block 206.

At block 206, an animation of a 3D avatar (e.g., an avatar associated with the first user participating in a virtual experience and/or a call hosted on a virtual experience platform) is generated based on the facial landmarks and the head orientation of the first user. In this context, animation refers to creating a set of frames or motions that simulate movement or changes in appearance for a digital object. The facial landmarks and head orientation are used to produce corresponding movements and expressions for a virtual character, referred to as a 3D avatar. A 3D avatar is a digital representation of the user within a virtual experience. It is constructed using a 3D model such that manipulation can be performed in virtual space, enabling the avatar to move, rotate, and exhibit changes in facial expressions. In some implementations, the avatar represents the appearance of a user or a stylized version of the user. In some implementations, the 3D model is manipulated in response to the communication inputs of the user, including facial movements and head orientation, to create an animated and interactive character within the virtual experience.

In some implementations, to generate the animation, the spatial data from the facial landmarks is processed, such as the position of the eyes, nose, mouth, and other keypoints, and applies this data to control the facial movements of the 3D avatar. For example, if the facial landmark data indicates that the user is smiling, the position of the mouth and facial muscles of the 3D avatar is adjusted to reflect this expression. Head orientation data, such as roll, pitch, and yaw, is used to animate the head movements of the avatar, allowing the avatar to look in different directions or tilt its head in accordance with the movements of the user.

In some implementations, the generation of the animation includes a set of transformations applied to the mesh or skeleton of the 3D avatar. In some implementations, the 3D avatar may be rigged with a skeletal structure that allows for precise control of individual bones, such as the jaw, neck, and eye sockets. The facial landmark and head orientation data are applied to adjust the bones in a manner that mirrors the movements of the user without user-perceptible lag. In other implementations, the surface of the mesh of the avatar is manipulated using the facial landmarks to deform the skin and/or muscles of the avatar to replicate the expressions and movements of the user.

In some implementations, the communication inputs from the first device include audio input, facial expressions and mouth movements are generated for the 3D avatar based on the audio input. Audio input refers to the data captured by a microphone of the first device, which may include, e.g., spoken words, vocal sounds, or other audio signals. The audio input is processed to detect characteristics such as, e.g., speech patterns, volume, pitch, and cadence, which are used to animate the facial movements of the 3D avatar, specifically its mouth and other features involved in speech.

In various implementations, to generate the facial expressions and mouth movements, techniques are utilized that analyze the audio input and correlate it with specific animations for the avatar. For example, speech recognition or phoneme-mapping techniques may be employed to identify sounds and match them to corresponding mouth shapes. The mouth movements of the avatar are adjusted in sync with the detected sounds (and matching mouth shapes), ensuring that the mouth positions reflect the patterns of speech being produced by the user. Other facial elements may be adjusted, such as the eyebrows or cheeks, to convey additional emotions based on the tone or volume of the audio input.

In some implementations, broader facial expressions can be generated for the 3D avatar. For example, when loud or emphasized speech is detected, the avatar may be animated to display expressions such as raised eyebrows or widened eyes, reflecting intensity or surprise. Softer or calmer speech might lead to more neutral facial expressions. The animation is continually updated as new audio input is received, allowing the facial expressions of the avatar to remain aligned with the ongoing speech of the first user. Block 206 may be followed by block 208.

At block 208, the head orientation of the first user is mapped to an orientation of the first device based on one or more of roll, yaw, and pitch of the orientation of the first device. In some implementations, head orientation represents the angular position of the head of the user as described by three rotational axes: roll, yaw, and pitch. Roll represents the rotation of the head around the front-to-back axis, yaw describes the rotation around the vertical axis, and pitch refers to the rotation around the side-to-side axis. The three parameters collectively define the precise orientation of the head of the user in space. The orientation of the first device refers to the angular position of the device in relation to its environment, described in terms of roll, yaw, and pitch. In some implementations, the device orientation data is acquired from sensors embedded in the device, such as, e.g., gyroscopes, accelerometers, or magnetometers. The sensors detect the movement and orientation of the device along the three rotational axes, allowing changes in the position of the device in real space to be continually tracked.

Mapping the head orientation of the user to the orientation of the device includes aligning the rotational values of roll, yaw, and pitch between the head of the user and the device. For example, if the head of the user turns to the left (yaw rotation), the corresponding yaw value is mapped to the yaw orientation of the device, adjusting the virtual representation of the user—the 3D avatar—to reflect this change. Similarly, when the user tilts their head up or down (pitch rotation), the pitch of the orientation of the device is modified to maintain alignment between the head movement of the user and the current position of the device.

In some implementations, mapping allows the relationship between the head orientation of the user and the orientation of the device to be tracked. In some cases, the orientation data may be processed and normalized to account for variations in device placement or user posture. For instance, scenarios may be compensated for where the device is held at an angle relative to the head of the user, or where the head of the user is not aligned with the camera of the device. The adjustments allow the head orientation data to be applied to the device, enabling accurate representation of the movements of the user within the virtual experience. Block 208 may be followed by block 210.

At block 210, a virtual camera position is adjusted based on the head orientation of the first user. Virtual camera position refers to the simulated viewpoint or perspective within a virtual environment (a 3D space) from which a scene (e.g., a scene depicting avatars associated with two or more users participating in a virtual call) is rendered. This virtual camera operates as a digital equivalent of a real-world camera, controlling the part of the virtual scene that is visible to the user or other participants. By adjusting the virtual camera position, the virtual environment is displayed relative to the orientation of the head of the user.

In some implementations, the adjustment of the virtual camera position is based on the roll, pitch, and yaw values calculated from the head orientation of the user. For example, if the user turns their head to the right (yaw), the virtual camera is repositioned to provide a corresponding view of the virtual environment, effectively rotating the scene (displayed to the user) in sync with the head movement. Similarly, when the head of the user tilts up or down (pitch), the virtual camera shifts its viewpoint accordingly, allowing the user to look at different parts of the virtual space. Roll adjustments can account for situations where the user tilts their head to the side, modifying the camera perspective to match this rotation.

In some implementations, the virtual camera position is continually updated as new head orientation data is received, creating a fluid and responsive interaction. For instance, in a VR or AR application, the virtual camera position may be adjusted in real-time or near-real-time (without user percep-tible lag) to reflect natural head movements of the user, allowing the user to explore the virtual experience through head gestures. This interaction allows the virtual camera to align the viewpoint of the user with the virtual space.

In some implementations, additional parameters may be applied to refine how the virtual camera position is adjusted. For example, constraints may be placed on the camera movement to avoid extreme or unnatural transitions, smoothing techniques may be used to prevent jittering or rapid shifts in the camera position due to small head move-ments, etc. The virtual camera position may account for other factors, such as the position of the shoulders or body of the user, to provide a more complete and natural perspec-tive within the virtual environment. Through the adjust-ments, the orientation of the virtual camera is maintained in accordance with the movements and orientation of the head of the user.

In some implementations, adjusting the virtual camera position includes determining the position of the shoulders of the first user in relation to the head orientation and using the shoulder position to calculate a depth for the animation of the 3D avatar. The position of the shoulders is detected based on the communication inputs from the first device, which may include video or sensor data. The shoulders provide additional reference points for understanding the posture and body orientation of the user, which are used for creating an accurate depth representation of the 3D avatar in the virtual experience.

In some implementations, the position of the shoulders relative to the head orientation is determined by analyzing the spatial relationship between the head and the torso of the user. For example, if the head of the user is turned to the side, the detected positions of the shoulders are used to calculate the corresponding depth and angle of the body of the avatar.

In some implementations, a depth for the animation of the 3D avatar is calculated. Depth refers to the distance between the virtual camera and the avatar in the 3D space, allowing proper positioning and scaling of the avatar within the environment. The depth calculation uses the relative posi-tions of the head and shoulders to ensure that the body and movements of the avatar are accurately depicted. For example, if the user is leaning forward or backward, the depth of the avatar is adjusted to reflect that motion, ensur-ing that the position of the avatar in the virtual space remains aligned with the physical actions of the user.

In some implementations, the virtual camera position is adjusted based on the calculated depth, allowing the avatar to be rendered in the correct location and at a correct scale relative to other objects or users in the virtual environment. The field of view and perspective of the camera may be updated to account for the body posture and depth changes of the user, ensuring that the movements and position of the avatar align smoothly with the inputs of the user. The continuous tracking of both head and shoulder positions helps maintain accurate depth calculations, which are reflected in the animation of the avatar as the user interacts within the virtual experience. Block 210 may be followed by block 212.

At block 212, communication inputs are received from a second device associated with a second user in the virtual experience, the second device having additional features not present on the first device. Communication inputs, in this context, refer to data or signals transmitted by the second device, which may include inputs such as, e.g., video, audio, or sensor data. The second device is associated with the second user and serves as the hardware through which the second user interacts with the virtual experience. This device transmits inputs that are processed to interact with the virtual experience or the behavior of the avatar representing the second user.

The second device differs from the first device by having additional features. Additional features refer to capabilities or functionalities that are present on the second device but not available on the first. In various implementations, the additional features may include, for example, support for VR or AR, higher-resolution video feeds (than that from the first device), advanced motion tracking sensors (e.g., that accurately track motion of different body parts of the user, such as wearable sensors), or more sophisticated audio input systems (e.g., two or more microphones that capture stereo and/or spatial audio).

In some implementations, the second device is a VR headset, and the additional features include VR-specific inputs and outputs. In various implementations, VR-specific inputs can include data provided by the headset, such as, e.g., head-tracking, motion sensors, and hand-tracking con-trollers, which allows the physical movements and orienta-tion of the second user to be captured. The inputs are used to animate the 3D avatar of the first user within the virtual experience, adjusting features such as head movements and hand gestures to reflect the physical actions of the user. In various implementations, VR-specific outputs can include stereoscopic 3D visuals and spatial audio, which are deliv-ered to the headset, creating an immersive experience for the second user. The enhanced avatar of the first user is rendered in the virtual environment based on the inputs and outputs, allowing the second user to view and interact with the avatar from various angles and positions within the 3D space.

Upon communication inputs from the second device being received, the inputs are processed in a manner respective to the specific features of the second device. For example, if the second device includes advanced motion tracking, the advanced motion tracking data is used to provide accurate movement for the avatar associated with the second user (e.g., in comparison with motion based on less granular data or simulated motion). If the second device supports high-definition video input, this data might be used to generate a refined and lifelike avatar representation or adjust camera angles accordingly. In the case of a VR- or AR-enabled device, the inputs may include data from the physical environment of the user or movement of the user in space, which is integrated into the virtual experience.

In some implementations, the second device is an AR headset, and the additional features include AR-specific functionality. AR-specific functionality refers to the capability of the second device to overlay digital content, such as the 3D avatar of the first user, onto the real-world environment, as viewed through the AR headset. The 3D avatar of the first user is rendered within the real-world environment captured by the cameras or other sensors of the AR headset. The spatial data from the real world is processed, such as the physical layout of the environment and the movements of the user, to determine where and how the 3D avatar of the first user is to be positioned. For example, if the AR headset detects a flat surface like a table, the avatar of the first user can be rendered standing or sitting on that surface. The position, scale, and orientation of the 3D avatar of the first user are adjusted to align with the real-world context, ensuring that the avatar appears naturally integrated into the environment.

In various implementations, the inputs from the AR headsets are utilized, such as, e.g., depth sensors, motion tracking, and real-time or near-real-time camera feeds, to continually update the rendering of the 3D avatar of the first user as the first user moves or interacts with the physical world. If the user wearing the AR headset walks around the 3D space or interacts with physical objects, the position and movements of the avatar are adjusted in response to the inputs. The AR-specific functionality allows the avatar associated with the user to remain spatially aligned with the real-world perspective of the user, ensuring that the movements and appearance of the avatar are in sync with the physical surroundings. Block 212 may be followed by block 214.

At block 214, the animation of the 3D avatar of the first user is enhanced using the additional features of the second device, which can leverage data from the first device to improve the representation of the avatar of the first user. The first device, such as a mobile smartphone, may provide basic data such as facial landmarks, head orientation, and movement inputs, which are used to generate the initial 3D avatar of the first user. However, the second device, which may have more advanced capabilities like a VR headset, can use this same data to enhance the avatar in ways that the first device cannot fully support.

In some implementations, the facial landmarks and head orientation data provided by the first device are used by the second device to refine the animation of the avatar of the first user. In the case where the first device is limited to displaying the avatar of the first user on a 2D screen, the second device can take the head orientation data and map the avatar of the first user into a fully immersive 3D space. The orientation of the head relative to the first device, including roll, yaw, and pitch, is used by the second device to position the head of the avatar of the first user in a way that accurately reflects spatial positioning within a virtual environment. The second device enhances the animation of the avatar of the first user by adding depth and spatial accuracy, so the avatar can interact more naturally within the virtual space.

In some implementations, the second device can utilize the facial landmarks from the first device to add further layers of realism to the avatar of the first user. For example, a VR headset might have the capability to display more nuanced facial expressions by interpolating the facial landmark data from the first device. This allows the second user to see a more detailed and expressive avatar of the first user, even though the first user is using a device with more limited rendering capabilities. The VR system can extrapolate from the basic data provided by the first device to enhance the animation, including more sophisticated movement of the eyes, mouth, or other facial features.

The mapping of the head orientation from the first device to its orientation (determined by roll, yaw, and pitch) can also be utilized by the second device to enhance how the avatar of the first user moves within the virtual space. For example, if the first device is a mobile phone and can only track limited head movements, the VR headset of the second device can expand upon this data, adjusting the orientation of the avatar of the first user in 3D space to reflect more natural and fluid movement within the virtual environment. The system allows the second device to apply its own advanced rendering capabilities to the base data collected from the first device, even though the first user only experiences the avatar in a more basic form on their device.

In some implementations, the enhanced animation of the 3D avatar of the first user includes a portion of a call in the virtual experience between the first user and the second user. A virtual phone call refers to an interactive communication session between two or more users conducted within a virtual experience (or other 3D space provided by a virtual experience platform). In this case, the virtual phone call includes not only traditional voice or video elements but also the representation of the users as animated 3D avatars within the shared virtual experience. The enhanced animation of the 3D avatar of the first user reflects the ongoing interaction during the virtual phone call, incorporating real-time or near-real-time communication inputs from both users. The inputs may include one or more of voice data, head and/or body movements, facial expressions, and gestures. As the virtual phone call proceeds, the inputs are used to animate the 3D avatars of both the first and second users, making them appear to engage in the call visually within the virtual experience. For example, the avatar of the first user may move its mouth and display facial expressions that correspond to the audio input from the speech of the first user.

The virtual phone call occurs within a virtual experience, meaning that the conversation is represented visually, allowing both users to see the 3D avatars of one another while communicating. In some implementations, the avatars may be positioned in a virtual space where they appear to be facing each other, and their movements and expressions dynamically change based on the ongoing communication. The enhanced animation of the avatars is continually updated as the conversation progresses, ensuring that movements of the avatars are synchronized with the spoken words and other inputs of the users.

In some implementations, the enhanced animation can incorporate additional virtual elements related to the phone call, such as, e.g., spatial positioning or virtual objects. For example, the position of the avatars may be adjusted based on the relative virtual locations of the users within the environment. The virtual phone call, as part of the broader virtual experience, thus includes both traditional communication methods and the visual representation of the users as 3D avatars. Block 214 may be followed by block 216.

At block 216, the enhanced animation of the 3D avatar of the first user is provided to the second device for display on the second device. In this context, providing refers to the transmission of the enhanced 3D avatar of the first user to the second device, where it is rendered and displayed. The display of the avatar allows the second user to view the enhanced animation, reflecting the additional features integrated from the capabilities of the second device, such as, e.g., motion tracking, high-resolution rendering, or virtual reality elements.

In various implementations, the enhanced animation is transmitted as a data stream or series of frames. The animation data is encoded in a format compatible with the second device, ensuring that the additional features of the avatar are correctly rendered for display. For instance, if the second device is a VR headset, the enhanced 3D avatar of the first user may be presented in an immersive 3D environment, allowing the second user to observe or interact with the avatar from multiple angles. If the second device is an AR device, the avatar of the first user may be superimposed onto the real-world environment as captured by the camera of the device.

In some implementations, the display on the second device includes rendering the enhancements made to the avatar based on the additional features available on the second device. For example, if the second device supports advanced facial expression recognition or higher frame rates, the 3D avatar of the first user may display smoother movements, more in-depth facial animations, or additional environmental interactions. In some implementations, the second device uses its own hardware, such as graphics processing units (GPUs) or display screens, to render and visually present the avatar with the enhancements in the virtual experience.

In some implementations, once the enhanced animation is displayed on the second device, the movements and expressions of the avatar are continually updated in response to ongoing communication inputs. The updates are transmitted to the second device, allowing the display to reflect real-time or near-real-time changes in the animation of the avatar. The second device renders each new frame or state of the avatar, maintaining synchronization between the enhanced features and the current virtual experience.

In some implementations, a request is received from the second device to switch from a VR mode to an AR mode. VR mode refers to an immersive experience in which the user is fully enclosed in a virtual environment, with no view of the physical surroundings. AR mode includes overlaying digital elements, such as the 3D avatar of the first user, onto the real-world environment of the user as viewed through the second device. The request to change modes is processed, and the display and interaction elements are adjusted accordingly.

When the request to switch to AR mode is received, the visual output is transitioned from the virtual environment to a mixed reality experience, where the 3D avatar of the first user and other digital elements are rendered in the context of the physical world. This includes adjusting the animation of the 3D avatar of the first user to account for its integration with real-world objects and spaces. For instance, the movements or gestures of the avatar may be modified to interact with real objects that are part of the augmented environment, using the camera feed from the second device to detect and map the objects.

In some implementations, in addition to adjusting the avatar of the first user, the virtual camera position is altered to align with the AR mode. The virtual camera, which was focused within a fully virtual environment in VR mode, shifts to track the view of the user of the real world through the camera of the second device. In some implementations, the field of view, depth perception, and position of the virtual camera are adjusted to ensure that the 3D avatar and other augmented elements appear correctly within the physical context. In some implementations, this adjustment may include recalibrating the position of the camera relative to real-world objects and surfaces detected by the sensors of the second device.

In some implementations, the avatar animation and virtual camera position are continually updated in real-time or near-real-time as the user interacts with the augmented environment. As the second device captures new inputs, such as changes in the perspective or movements of the user, the 3D avatar of the first user and its interactions are adjusted with both the virtual and physical elements. The switch from VR to AR mode introduces blended interaction where the behavior of the avatar is influenced by both virtual factors and real-world surroundings, enhancing the way the avatar is displayed and interacts within the augmented environment.

While the foregoing description refers to animation of a first avatar based on communication inputs from a first device, and of enhancing animation based on additional features of a second device, in various implementations, animation of a single avatar may be performed adaptively based on available inputs, computational and network resource availability, etc. For example, if a particular device has basic communication inputs (as recited with reference to block 202) and also additional features (as recited with reference to block 212), the avatar associated with the user of that device may be animated with only the basic communication inputs (animation as described with reference to blocks 202-210) in certain cases (e.g., less than a threshold computational or network resources being available such as low battery, low bandwidth network, low memory, etc.; other user devices in the virtual call being incapable of handling advance animation; etc.), and with enhanced animation (animation as described with reference to blocks 202-216) in certain cases (e.g., when computational and communication resources meet a threshold; when other participants in a virtual call have devices that can display the enhanced animation; etc.).

In some implementations, one or more of blocks 202-216 may be performed by one or more server devices, and one or more of blocks 202-216 may be performed by one or more client devices. In some implementations, all of method 200 may be performed by a server device, or by a client device. In some implementations, one or more of blocks 208, 210, and 214 may be omitted. In some implementations, one or more of blocks 202, 204, and 206 may be performed in parallel. In some implementations, one or more of blocks 208 and 210 may be performed in parallel. In some implementations, blocks 212 and 214 may be performed in parallel.

Figure 3A:
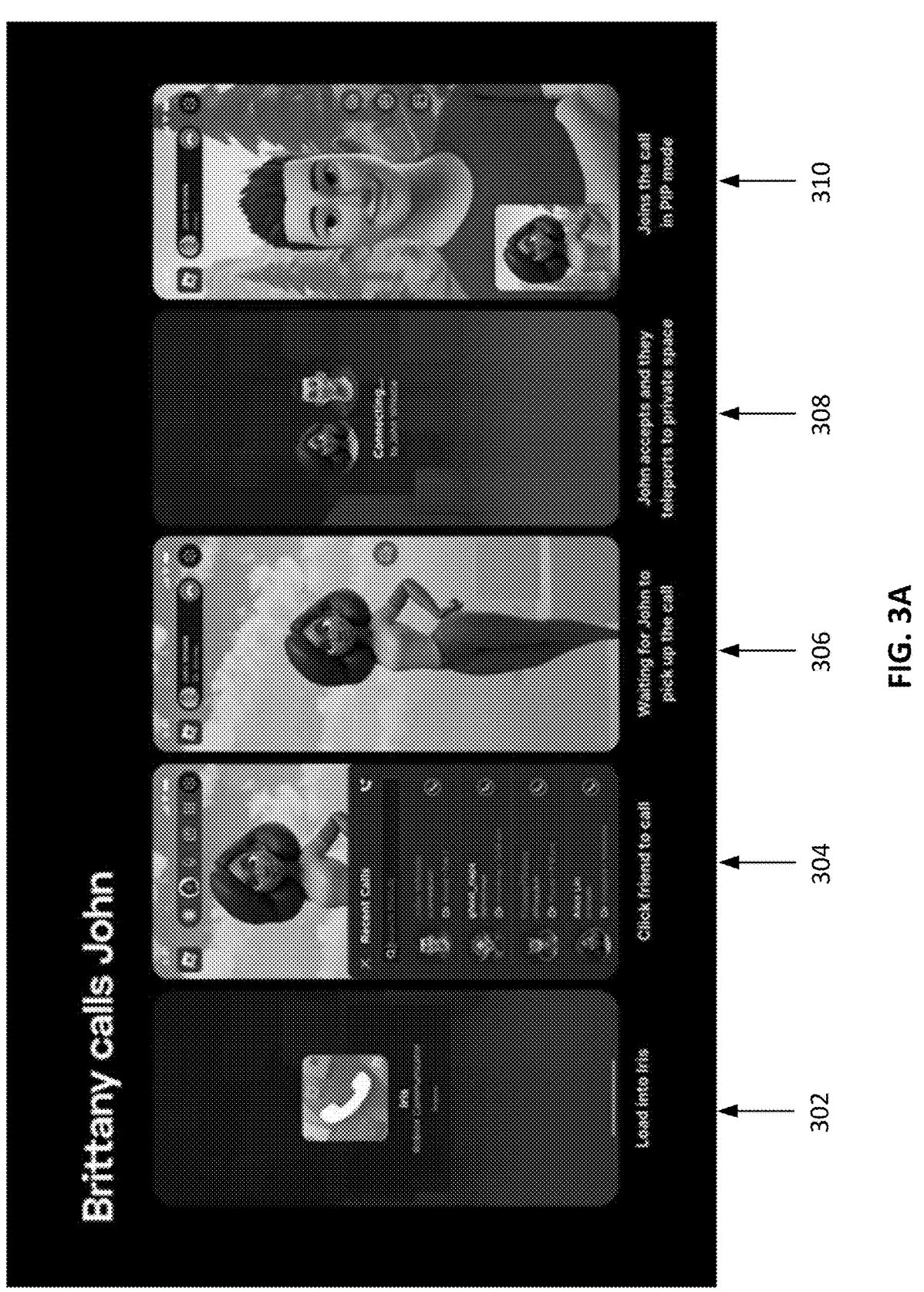
FIG. 3A illustrates example screenshots of a call initiated by a caller, in accordance with some implementations.

FIG. 3A illustrates example screenshots 302-310 depicting a call initiated by a user within a virtual experience, in accordance with some implementations. The figure demonstrates the interactions involved in starting, waiting for, and conducting a call between two users in a virtual experience.

At 302, the application is launched on a device. This application, whether a standalone program or integrated within a broader virtual experience, allows users to enter a digital environment where they can interact and initiate communication with other participants. The application can be triggered from within an already active virtual experience, seamlessly integrating communication features.

At 304, a call is initiated by a user by selecting a contact from a recent calls list or another similar interface. This action establishes direct communication within the virtual experience. The interface displays an avatar of the caller while waiting for the connection with the recipient to be established. This illustrates how the virtual experience and calling system interact, with the avatar of the user actively represented during the call initiation.

At 306, the screenshot shows a waiting period where the user awaits a response to the call. During this time, the avatar of the caller remains visible and active in the virtual experience, indicating that the call is in progress but has not yet been answered. The pending state is maintained, allowing the caller to stay engaged with the environment until the call is accepted.

At 308, once the call is accepted, the users are connected and teleported to a private space within the virtual experience. This private space can either be part of the current virtual experience or a separate area dedicated to private communication. The connection creates an isolated interaction between the users, preventing other participants in the broader virtual experience from intruding on the call. In some cases, this private space may be integrated within the ongoing virtual experience, while in others, it may include a distinct space for private conversations.

At 310, the call is in progress, and the user views the interaction in a picture-in-picture (PIP) mode. In this mode, the avatar of the caller is shown in a smaller secondary window while the primary display focuses on the avatar of the recipient. This setup allows both avatars to remain visible, maintaining the presence of both users within the virtual experience throughout the call. The PIP configuration enables the user to view both their own avatar and the avatar of the other participant, ensuring that the virtual interaction is fully represented during the call.

Figure 3B:
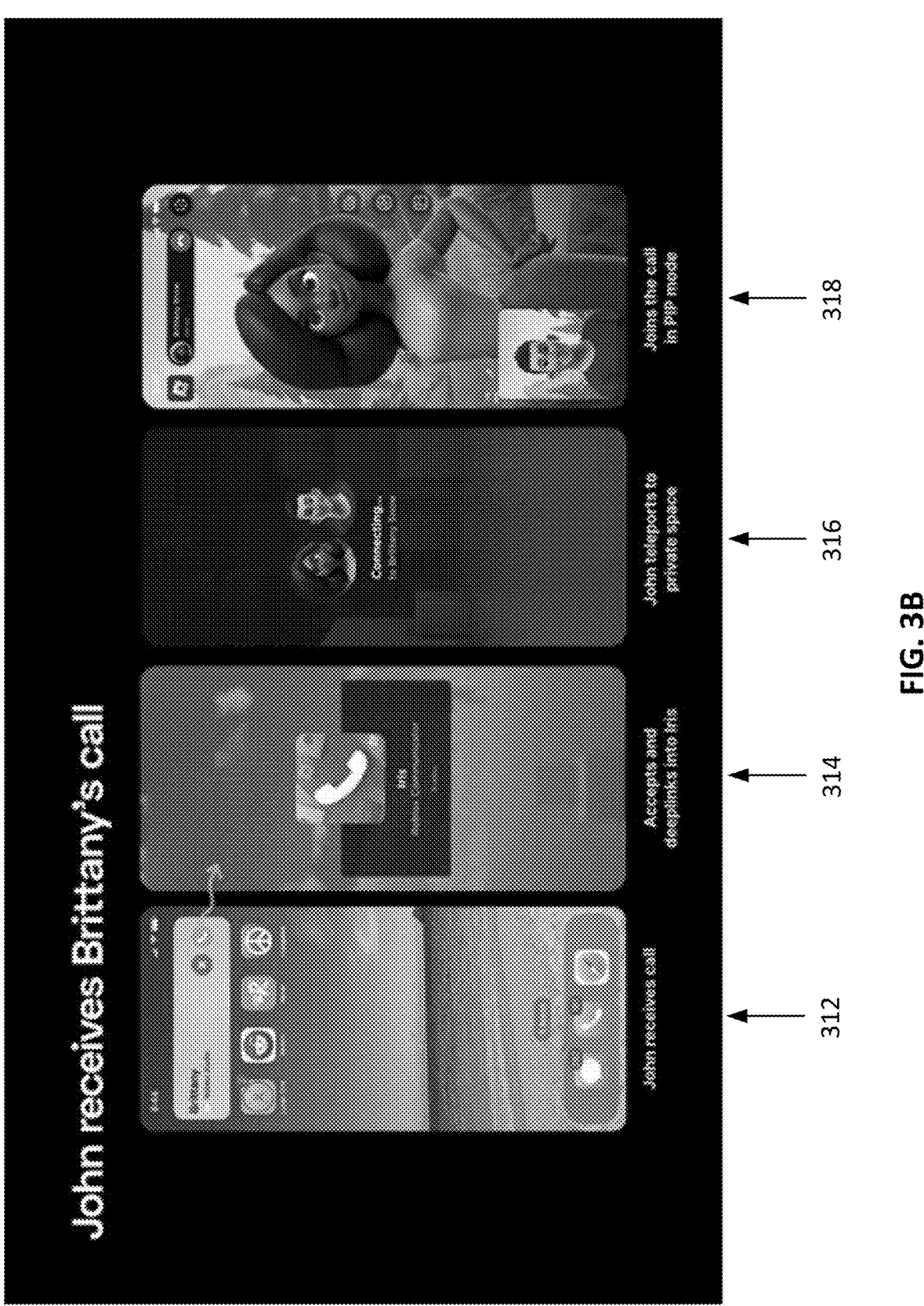
FIG. 3B illustrates example screenshots of a call received by a recipient, in accordance with some implementations.

FIG. 3B illustrates example screenshots 312-318 depicting a call from the perspective of a recipient of the call within a virtual experience, in accordance with some implementations. The screenshots illustrate the steps included in receiving, accepting, and participating in a virtual call, where both users are represented by avatars in the digital space.

At 312, the recipient of the call receives a notification of the incoming communication on their device. This notification indicates that a call is being initiated by another user, and it prompts the recipient to take action. The notification may appear as a pop-up or other interface element, depending on the configuration of the application and the virtual experience.

At 314, the recipient accepts the incoming call. Upon accepting the call, the recipient is linked into the application, where the virtual experience is initiated. This may include the virtual experience being launched, the relevant assets being loaded, and the recipient being transitioned into a shared virtual space. The call is established, connecting the users within the virtual experience.

At 316, after accepting the call, the device of the recipient displays a private space within the virtual experience. This private space allows the users to communicate without interference from other participants in the virtual world. The private space can be within the same virtual experience where the call was initiated, or it may be a separate, isolated area designed specifically for one-on-one interactions. The recipient is transitioned into this new space seamlessly, allowing the communication session to proceed.

At 318, the virtual call takes place, and the recipient participates in a PIP mode. In this view, the avatar of the recipient is displayed in a smaller window while the primary screen shows the avatar of the caller. This configuration allows both users to observe the movements and actions of their own avatars while focusing on the avatar of the other participant in the main display. The PIP mode enhances the interaction by maintaining the presence of both users in the virtual experience while they engage in the call.

The examples of FIGS. 3A and 3B are described in the context of a call being initiated by a user who is present in a virtual experience, while the recipient of the call is not currently in any virtual experience. Other entry points for a call may be enabled in different embodiments. For example, both participants may already be present in the same virtual experience when the call is initiated, or they may be in separate virtual experiences. In another scenario, neither participant is in a virtual experience initially, but both are placed into a virtual experience once the call is started. Alternatively, the caller may not be in a virtual experience at the time of the call initiation, while the recipient is already present in one, and both are moved into the same or another virtual experience for the call.

Figure 4:
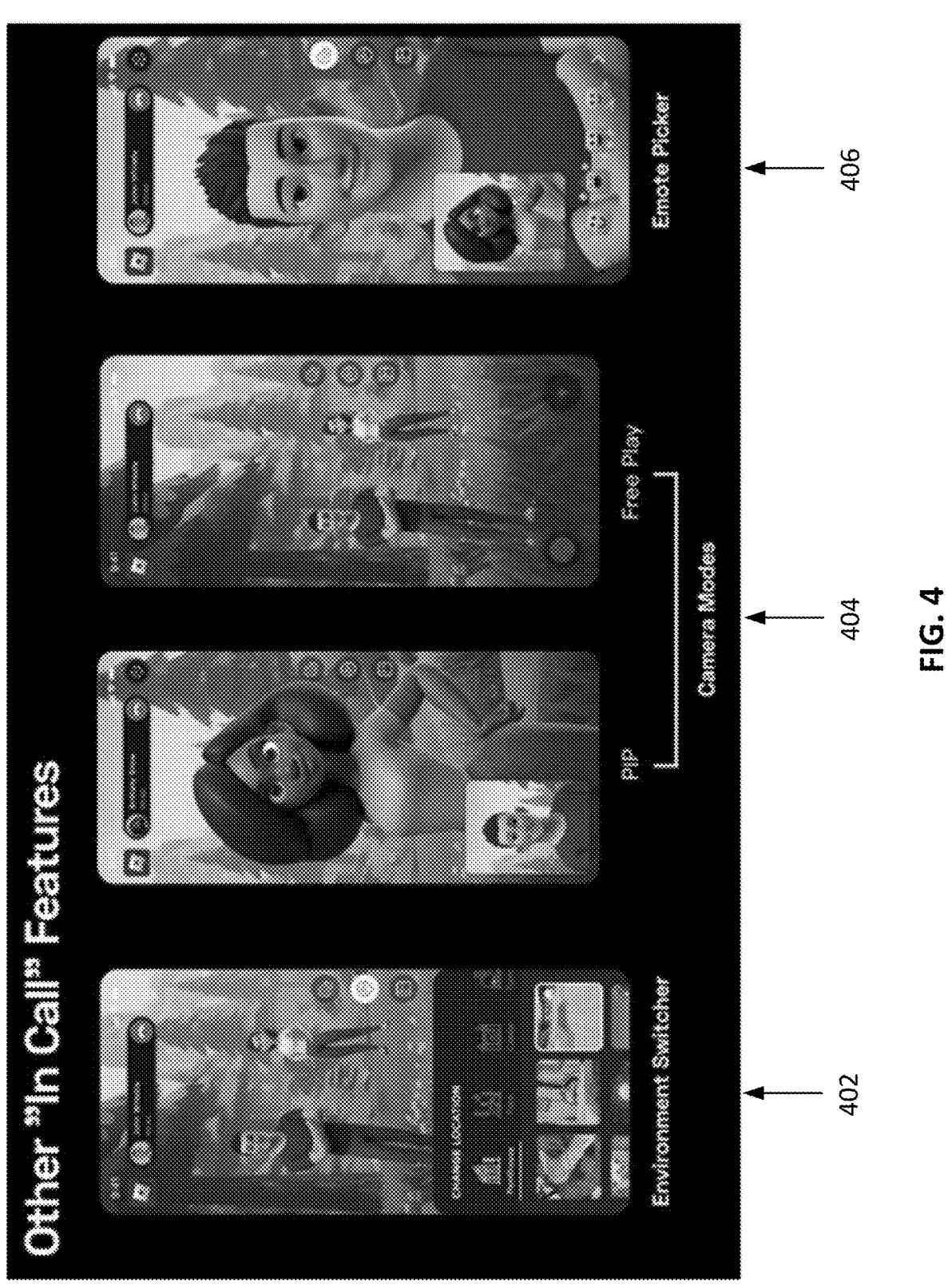
FIG. 4 illustrates example screenshots of features that may be used while conducting calls within a virtual experience, in accordance with some implementations.

FIG. 4 illustrates example screenshots 402-406 of features that may be used while conducting calls within a virtual experience, in accordance with some implementations. The example screenshots 402-406 depict functionalities that enhance interaction during virtual calls, providing additional control over the virtual experience.

At 402, an environment switcher is shown, allowing participants in a virtual call to change the backdrop or environment in which they are interacting. This feature provides the ability to switch between various settings, such as changing from a forest scene to a beach scene. In various implementations, this switch may include transitioning between different virtual experiences or simply changing the scenery within the same experience. This enhances the flexibility of the virtual interaction, allowing users to modify the virtual setting in near-real-time while staying connected during the call.

At 404, various camera modes are presented, offering different ways to view the virtual experience during the call. The modes include a PIP mode, where the avatar of one participant is displayed in a smaller window while the main screen focuses on the other participant. Another mode shown is Free Play, where both users are displayed in a shared view, allowing for more interaction within the same virtual space. The camera modes provide multiple perspectives, allowing users to choose how they want to engage visually during the call, depending on their preferences or the nature of the interaction.

At 406, an emote picker tool is displayed. This feature allows users to select from a menu of emoticons or emojis, which trigger specific expressions or emotions for their avatars. When an emote is chosen, the corresponding facial expression or body language is animated on the avatar, enabling the user to communicate emotions visually during the call. This adds a layer of expressiveness to the interaction, as users can supplement their verbal communication with non-verbal cues through their avatars.

Figure 5:
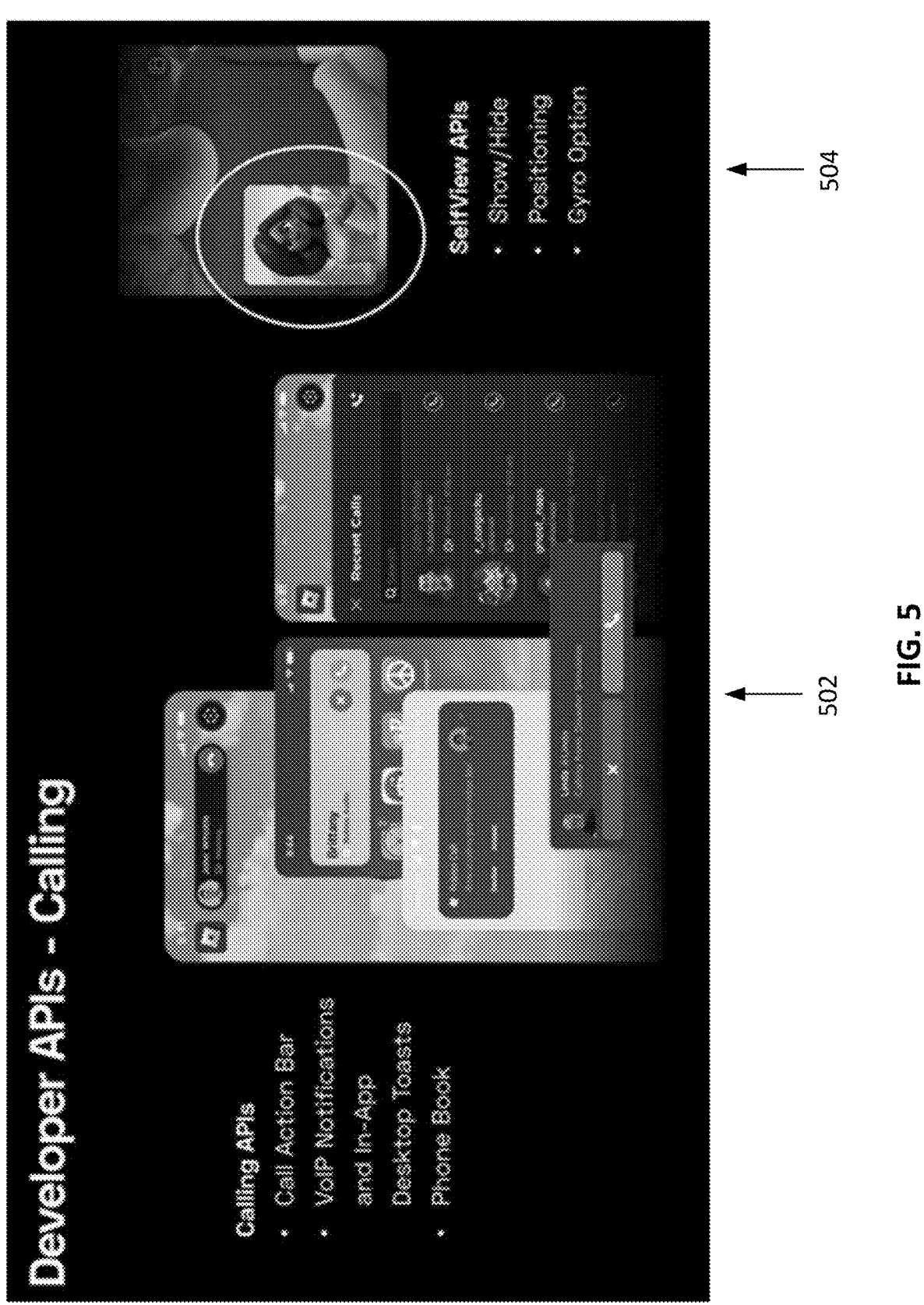
FIG. 5 illustrates examples of interfaces that may be provided by application program interfaces (APIs) in relation to calling features within a virtual experience, in accordance with some implementations.

FIG. 5 illustrates examples of interfaces that may be provided by application program interfaces (APIs) in relation to calling features within a virtual experience, in accordance with some implementations. The figure illustrates how APIs can enable customization of the calling functionality and user interface, in order to allow users and developers to modify how certain features are displayed and interacted with during calls.

At 502, the figure shows various calling-related APIs. The APIs allow developers to integrate specific calling functionalities into the application, such as rendering a call action bar, which provides options for managing active calls. The call action bar may include features like muting, ending the call, or switching modes. Additionally, APIs can enable the display of voice over IP (VoIP) notifications, both in-application and as desktop toasts. The notifications alert users to incoming or outgoing calls within the application, ensuring that they are kept aware of call statuses, even if they are not actively engaged in the app. Another function depicted in this section is the phone book, where the user can access and maintain contacts to initiate or receive calls.

At 504, the figure illustrates self-view APIs, which provide users control over how their own avatar or video feed is displayed during a call. The APIs allow for features like showing or hiding the self-view, which can be particularly useful for users who prefer not to see their own avatar or face during a conversation. The self-view can be repositioned within the interface, providing flexibility for users to move their own display to a location that does not obstruct the view of other participants. Additionally, a gyroscope option can be enabled, allowing the self-view to react to the physical movements of the user, such as tilting or rotating the device. This adds an interactive element to the self-view, allowing it to adjust dynamically based on the motion of the user.

Figure 6:
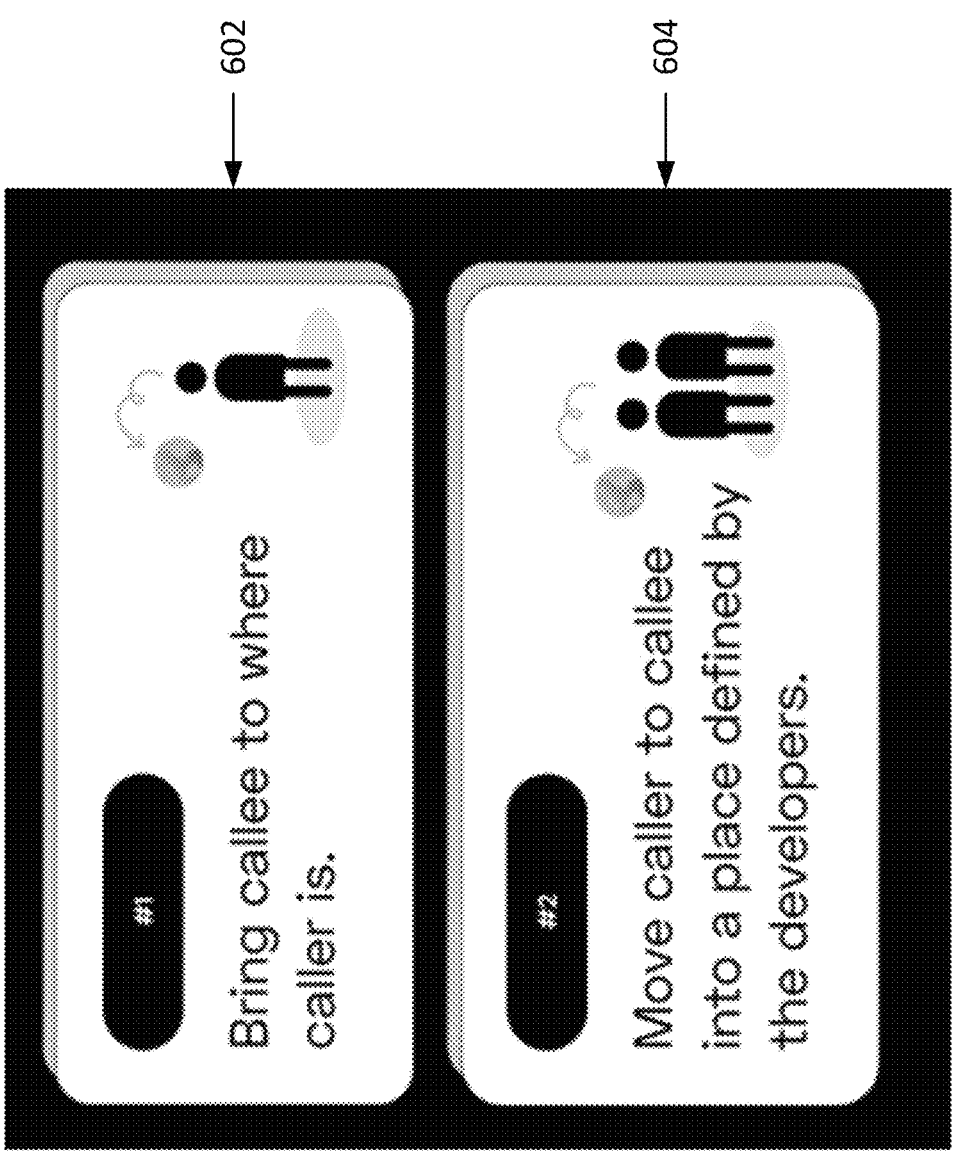
FIG. 6 illustrates examples of APIs that may be used to control where participants of a call are placed in a virtual experience, in accordance with some implementations.

FIG. 6 illustrates examples of APIs that may be used to control where participants of a call are placed in a virtual experience, in accordance with some implementations. The figure illustrates two different options for managing the spatial positioning of the caller and callee during a virtual call, enabling dynamic control over the environment where the interaction takes place.

At 602, the API depicted provides the functionality to bring the callee into the virtual experience where the caller is currently located. In this scenario, once a call is initiated and accepted, the callee is transported into the same virtual space that the caller is already occupying. This API ensures that both participants are in the same environment, allowing them to interact within the same virtual context. For example, if the caller is in a forest or cityscape, the callee is brought into that environment to continue the call in a shared space.

At 604, the second API controls the placement of both the caller and callee in a new virtual space, which has been predefined by developers. In this case, rather than bringing the callee to the current location of the caller, both participants are moved to a separate destination. This target location may be a specific virtual experience or server that has been reserved for such interactions. The API allows developers to customize the experience by defining the environment where the interaction takes place, which may be designed for private conversations or themed virtual spaces tailored for particular use cases.

Figure 7:
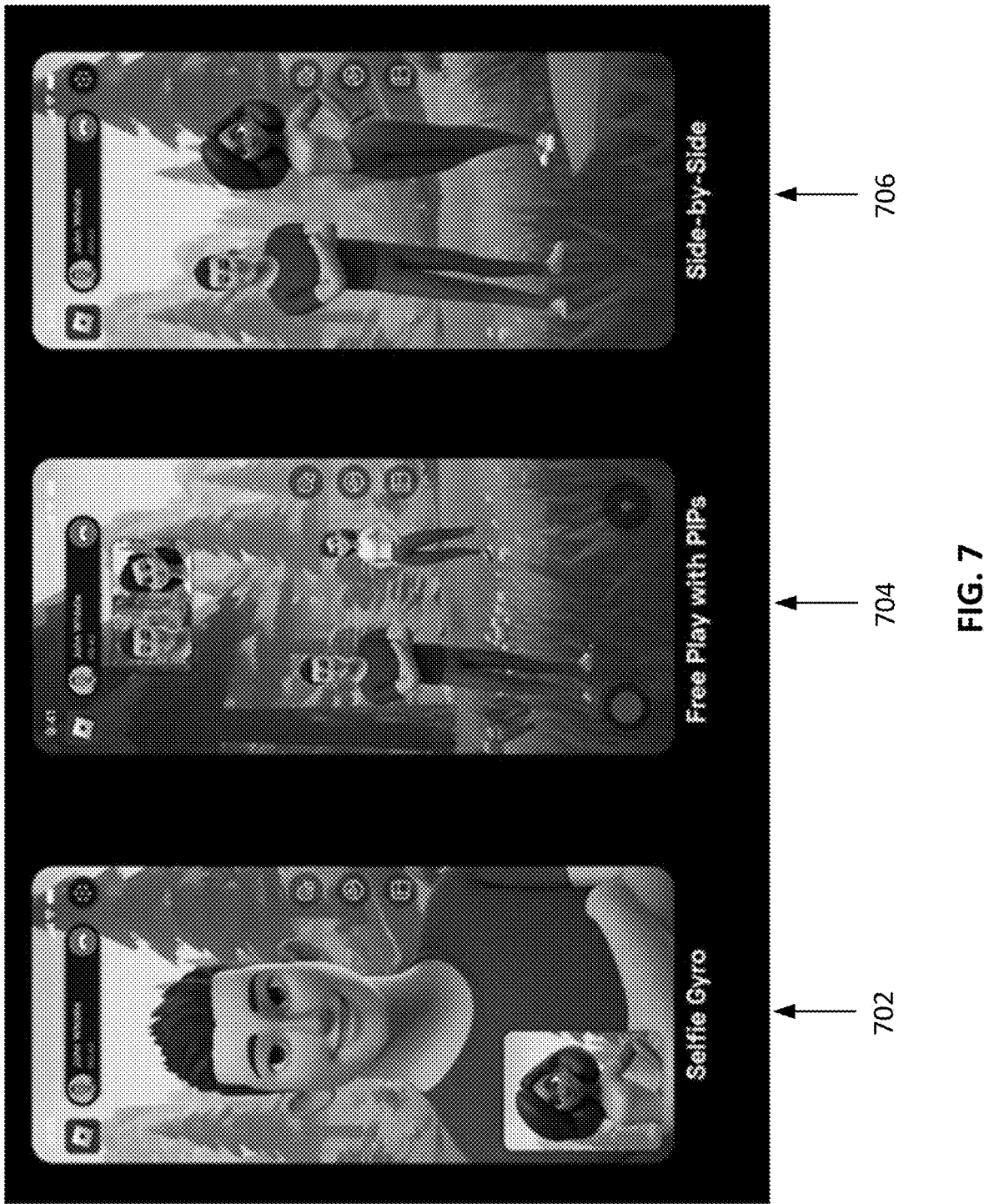
FIG. 7 illustrates various examples of views for a call during a virtual experience, in accordance with some implementations.

FIG. 7 illustrates various examples of views 702-706 for a call during a virtual experience, in accordance with some implementations. The views offer different ways of displaying the participants in a virtual call, providing users with flexibility in how they interact with each other in the shared virtual space.

At 702, the view shows a PIP configuration, where the main focus is on one participant, with a smaller sub-screen displaying the other participant. This particular view features a selfie gyro, meaning the avatar image in the sub-screen moves in response to the physical movements of the user. The selfie gyro uses the gyroscopic sensors of the device of the user to track head orientation and movement, creating a more dynamic and interactive experience for the user being displayed in the smaller PIP frame.

At 704, the figure demonstrates a free play view with PIP sub-screens showing the avatars of both participants. In this view, the participants are able to interact freely within the virtual experience, while smaller PIP frames display closer images of their avatars. This allows users to see in-depth facial expressions and reactions while maintaining an overview of the virtual space, creating a balanced interaction between the larger virtual experience and the personalized PIP views.

At 706, the view presents a side-by-side configuration, where both participants are placed next to each other in the virtual experience. This setup simulates a more natural conversation style, where the avatars of the users stand next to each other as if they are engaging in an in-person interaction.

Figure 8:
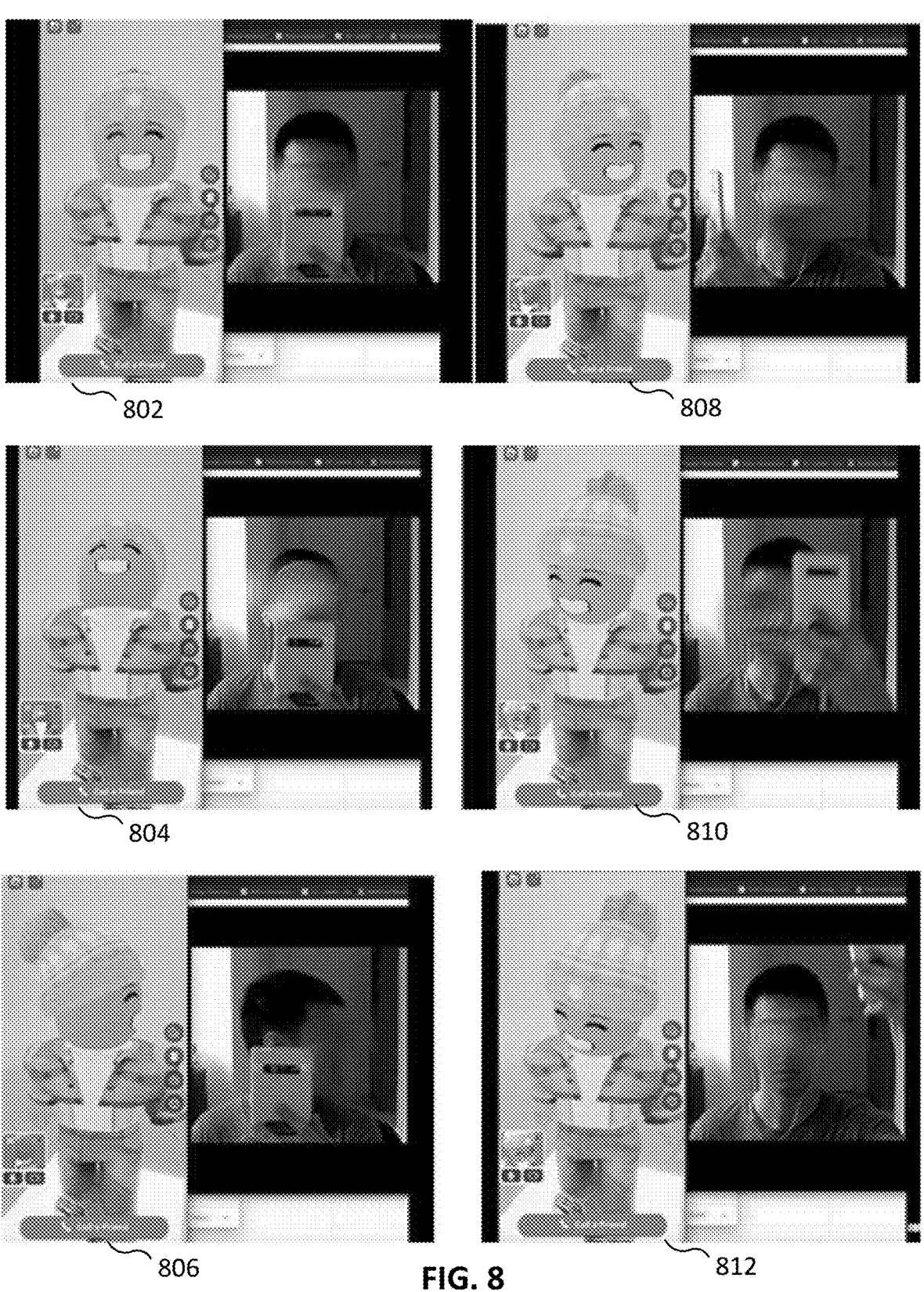
FIG. 8 illustrates examples of camera mapping during a call within a virtual experience, in accordance with some implementations.

FIG. 8 illustrates examples of camera mapping during a call within a virtual experience, in accordance with some implementations. The figure shows how movements made by the user, whether through the device camera or head movements, are translated into corresponding animations or movements of the avatar within the virtual experience. This camera mapping functionality enables real-time or near-real-time tracking of the physical actions of the user, which are reflected in the behavior of the corresponding avatar. It is noted that identifying facial features of the user have been intentionally blurred in FIG. 8.

At 802, the camera on the device of the user captures a front-facing image of the user, and the avatar is positioned to face forward, corresponding to the direct gaze of the user. The avatar is animated to reflect a neutral or default expression as the user maintains a forward-facing position. This initial state demonstrates how the camera maps the image of the user to create a direct correlation with the orientation of the avatar in the virtual experience.

At 804, as the user tilts their head upward, the camera captures this motion, and the avatar is correspondingly animated to look upward. The tilt of the head is mirrored in the movements of the avatar, illustrating that subtle changes can be detected in the posture or positioning of the user. The camera mapping allows the avatar to reflect natural movements, maintaining a synchronized representation between the real-world actions of the user and their virtual presence.

At 806, the user turns their head to the side while keeping the camera stationary. In response, the head of the avatar is animated to turn sideways, aligning with the head movement of the user. This illustrates how lateral head movements can be translated into corresponding actions by the avatar, ensuring that the avatar remains in sync with the real-world actions of the user.

At 808, the camera is moved slightly while the user maintains their head position, and the head of the avatar is adjusted accordingly, simulating movement in the virtual space. Head movements can be tracked, as well as changes in the position of the camera relative to the face of the user. This capability allows for a more flexible interaction where both the camera and head movements influence the positioning of the avatar.

At 810 and 812, additional combinations of head tilting and camera movement are illustrated. The movements of the avatar can be adjusted in response to both subtle and significant changes in the real-world positioning of the user.

FIG. 9 illustrates examples of different view modes on different devices for a call during a virtual experience, in accordance with some implementations. The figure depicts how different aspect ratios are used to display a virtual experience on various devices, such as a desktop computer monitor and a mobile phone. Both view modes attempt to maintain both participants within the field of view as they interact and move around within the virtual experience.

At 902, a smaller view (in portrait mode, where the aspect ratio of the view is such that the view is taller than wider, suitable for smartphones, tablets, or other devices held in portrait mode) is depicted, which represents the aspect ratio used for a display screen of a mobile phone. The avatars of both users are visible within the field of view, and the perspective is dynamically adjusted to ensure that both remain in sight, regardless of how they move within the virtual experience. This smaller view is optimized for the limited screen space of mobile devices while still providing a clear view of both participants.

At 904, the figure presents a larger view, i.e., a theater or cinematic view (in landscape mode, where the aspect ratio of the view is such that the view is wider than it is taller, suitable for devices in landscape mode), which represents the aspect ratio used on a desktop monitor. This view allows for a broader perspective of the virtual experience, offering more in-depth visuals and a wider field of view compared to the mobile phone display. Both avatars are again kept within the frame, allowing the users to see each other as they move around the campfire and interact with their surroundings. The cinematic view ensures that the interaction between users remains continuous and uninterrupted, regardless of the device being used.

In both the smaller view 902 and larger view 904, the avatars are fitted into the field of view to ensure that they remain visible as they move closer to or farther from each other within the virtual experience. The camera angle and zoom are dynamically adjusted to maintain focus on the avatars, creating a cohesive visual experience for both participants, whether they are using a mobile phone or a desktop computer. The avatars are positioned close together in 902 and 904. A first user is provided with a closeup shot 902 (portrait mode) depicting both avatars, while a second user is provided with a wide angle shot 904 (landscape mode) that depicts both avatars as well as more of the virtual space, including the fire (which is not present in the closeup shot 902).

In the middle screenshots 912 and 914, the avatars have moved a bit further away from each other such that they are positioned on either side of the fire. A closeup shot 912 in portrait mode is presented to a first user, depicting one avatar, a portion of the fire, and a portion of a second avatar, in order to capture both avatars within the narrow frame. A wide angle shot 914 in landscape mode is presented to a second user, depicting both avatars and the fire, as well as more of the surrounding virtual space.

In the lower screenshots 922 and 924, the avatars are even further apart. In the closeup shot 922 in portrait mode, the camera position and orientation is automatically adjusted based on avatar position and orientation to keep both avatars within frame while also providing a view of the 3D space where the avatars are located.

Figure 10:
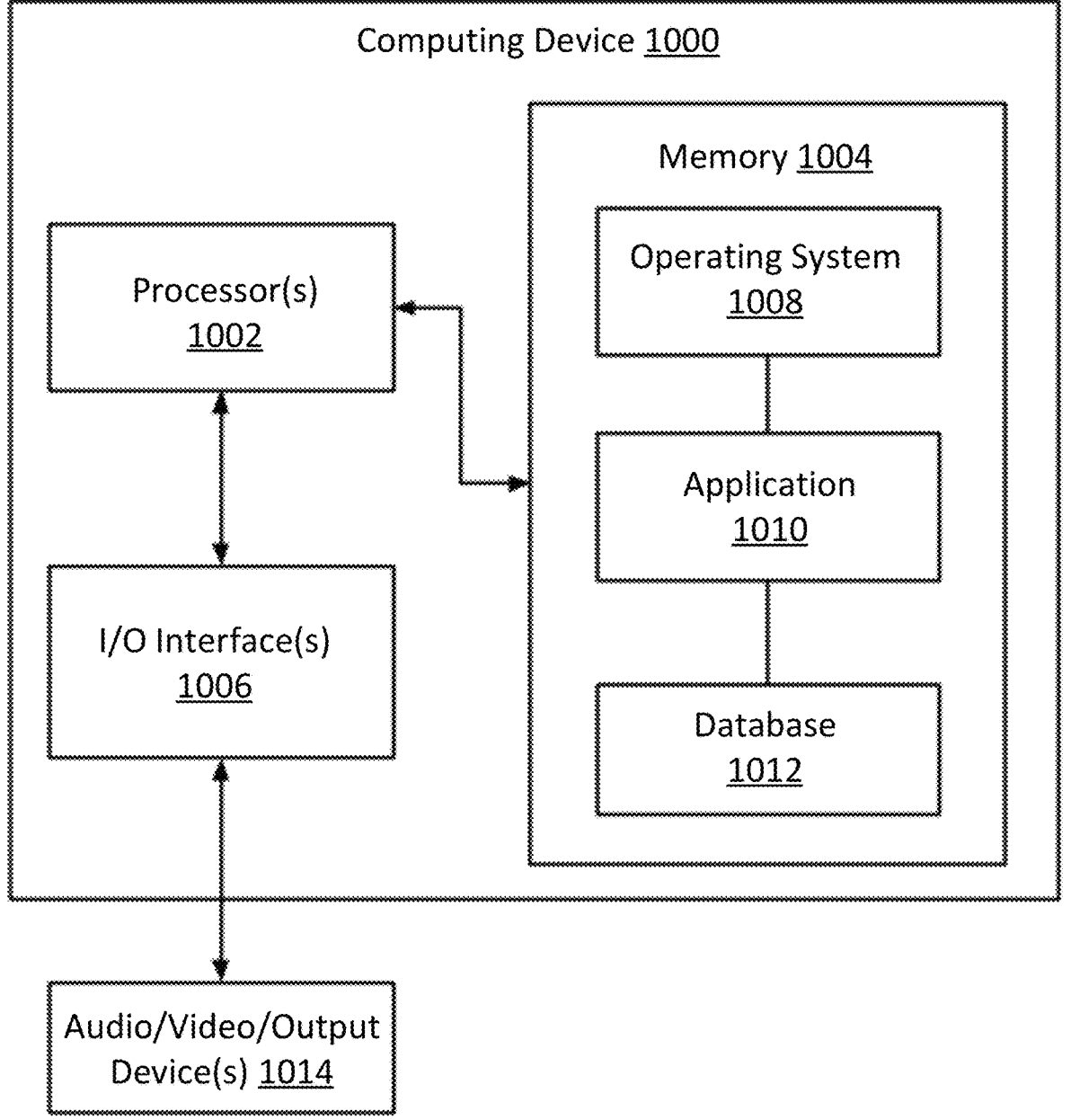
FIG. 10 is a block diagram that illustrates an example computing device, in accordance with some implementations.

FIG. 10 is a block diagram of an example computing device 1000 which may be used to implement one or more techniques described herein, including one or more techniques described with reference to FIG. 2. In one example, device 1000 may be used to implement a computer device (e.g., 102 and/or 110 of FIG. 1), and perform appropriate method implementations described herein. Computing device 1000 can be any suitable computer system, server, or other electronic or hardware device. For example, the computing device 1000 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1000 includes a processor 1002, a memory 1004, input/output (I/O) interface 1006, and audio/video input/output devices 1014.

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is provided in device 1000 for access by the processor 1002, and may be any suitable computer-readable or processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the computing device 1000 by the processor 1002, including an operating system 1008, one or more applications 1010, and a database 1012 that may store data used by the components of device 1000.

Database 1012 may store one or more mechanisms related to communication inputs, avatar animation data, and device-specific feature sets. This may include data for mapping facial landmarks, head orientation, and body movements that are captured from various devices. The database can store user profiles, including preferences for viewing modes (e.g., picture-in-picture, side-by-side) and device settings (e.g., VR or AR modes). This allows avatar animations to be dynamically adjusted based on stored data as users interact within a virtual experience.

For example, applications 1010 can include a module that implements the avatar animation engine, which processes the communication inputs received from devices and generates corresponding animations. This module may enable the transitions between different device types, adjusting the virtual camera position and avatar behavior when users switch from a mobile phone to a VR headset, for instance. Additionally, the module can apply device-specific features, such as enhanced facial tracking for more capable devices or simplified animations for lower-powered devices.

Elements of software in memory 1004 can alternatively be stored on any other suitable storage location or computer-readable medium. In addition, memory 1004 (and/or other connected storage device(s)) can store instructions and data used in the features described herein. Memory 1004 and any other type of storage (magnetic disk, optical disk, magnetic tape, or other tangible media) can be considered "storage" or "storage devices."

I/O interface 1006 can provide functions to enable interfacing the computing device 1000 with other systems and devices. For example, network communication devices, storage devices (e.g., memory and/or data store 120), and input/output devices can communicate via interface 1006. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 1014 can a variety of devices including a user input device (e.g., a mouse, etc.) that can be used to receive user input, audio output devices (e.g., speakers), and a display device (e.g., screen, monitor, etc.) and/or a combined input and display device, which can be used to provide graphical and/or visual output.

For ease of illustration, FIG. 10 shows one block for each of processor 1002, memory 1004, I/O interface 1006, and software blocks of operating system 1008 and virtual experience application 1010. The blocks may represent one or more processors or processing circuitries, operating systems, memories, I/O interfaces, applications, and/or software engines. In other implementations, device 1000 may not have all of the components shown and/or may have other elements including other types of elements instead of, or in addition to, those shown herein. While the online virtual experience server 102 is described as performing operations as described in some implementations herein, any suitable component or combination of components of online virtual experience server 102, client device 110, or similar system, or any suitable processor or processors associated with such a system, may perform the operations described.

Device 1000 can be a server device or client device. Example client devices or user devices can be computer devices including some similar components as the device 1000, e.g., processor(s) 1002, memory 1004, and I/O interface 1006. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 1014, for example, can be connected to (or included in) the device 1000 to display images pre-and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 200 and other described techniques) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, the particular implementations are merely illustrative, and not restrictive. Concepts illustrated in the examples may be applied to other examples and implementations.

The functional blocks, operations, features, methods, devices, and systems described may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, blocks, operations, or computations may be presented in a specific order, the order may be changed in different particular implementations. In some implementations, multiple steps or operations shown as sequential in this specification may be performed at the same time.

The invention claimed is:

1. A computer-implemented method comprising:
receiving communication inputs from a first device associated with a first user in a virtual experience, the communication inputs comprising at least a video input;
determining facial landmarks and head orientation of the first user based on the communication inputs;
generating an animation of a three-dimensional (3D) avatar of the first user based on the facial landmarks and the head orientation of the first user;

mapping the head orientation of the first user to an orientation of the first device based on one or more of roll, yaw, and pitch of the orientation of the first device;

adjusting a virtual camera position based on the head orientation of the first user, wherein the virtual camera position is a simulated viewpoint within the virtual experience from which a scene that depicts the 3D avatar of the first user is rendered;

receiving communication inputs from a second device associated with a second user in the virtual experience, the second device having additional features not present on the first device, wherein the additional features include hardware capabilities of the second device that are not available on the first device;

enhancing the animation of the 3D avatar based on the communication inputs from the second device; and providing the enhanced animation of the 3D avatar to the second device for display on the second device.

2. The computer-implemented method of claim 1, wherein the second device is a virtual reality (VR) headset, and the additional features comprise VR-specific inputs and outputs.

3. The computer-implemented method of claim 1, further comprising:

receiving a request from the second device to switch from a VR mode to an augmented reality (AR) mode; and adjusting the enhanced animation of the 3D avatar and the virtual camera position based on the AR mode.

4. The computer-implemented method of claim 1, wherein the communication inputs from the first device further comprise audio input, and wherein the method further comprises:

generating facial expressions and mouth movements for the 3D avatar based on the audio input.

5. The computer-implemented method of claim 1, wherein adjusting the virtual camera position comprises:

determining a position of shoulders of the first user in relation to the head orientation; and using the position of the shoulders of the first user to calculate a depth for the animation of the 3D avatar.

6. The computer-implemented method of claim 1, wherein the second device is an augmented reality (AR) headset, and the additional features comprise AR-specific functionality comprising at least rendering the 3D avatar in a real-world environment as viewed through the AR headset.

7. The computer-implemented method of claim 1, wherein enhancing the animation of the 3D avatar comprises adjusting an appearance and one or more movements of the 3D avatar based on device-specific features of the second device.

8. The computer-implemented method of claim 1, wherein the enhanced animation of the 3D avatar comprises a portion of a call in the virtual experience between the first user and the second user.

9. A system comprising:

one or more processors; and memory coupled to the one or more processors storing instructions that, when executed by the one or more processors, cause the one or more processors to perform operations comprising:

receiving communication inputs from a first device associated with a first user in a virtual experience, the communication inputs comprising at least a video input;

determining facial landmarks and head orientation of the first user based on the communication inputs;

generating an animation of a three-dimensional (3D) avatar of the first user based on the facial landmarks and the head orientation of the first user;

mapping the head orientation of the first user to an orientation of the first device based on one or more of roll, yaw, and pitch of the orientation of the first device;

adjusting a virtual camera position based on the head orientation of the first user, wherein the virtual camera position is a simulated viewpoint within the virtual experience from which a scene that depicts the 3D avatar of the first user is rendered;

receiving communication inputs from a second device associated with a second user in the virtual experience, the second device having additional features not present on the first device, wherein the additional features include hardware capabilities of the second device that are not available on the first device;

enhancing the animation of the 3D avatar based on the communication inputs from the second device; and providing the enhanced animation of the 3D avatar to the second device for display on the second device.

10. The system of claim 9, wherein the second device is a virtual reality (VR) headset, and the additional features comprise VR-specific inputs and outputs.

11. The system of claim 9, wherein the instructions cause the one or more processors to perform further operations comprising:

receiving a request from the second device to switch from a VR mode to an augmented reality (AR) mode; and adjusting the enhanced animation of the 3D avatar and the virtual camera position based on the AR mode.

12. The system of claim 9, wherein the communication inputs from the first device further comprise audio input, and wherein the instructions cause the one or more processors to perform a further operation comprising:

generating facial expressions and mouth movements for the 3D avatar based on the audio input.

13. The system of claim 9, wherein adjusting the virtual camera position comprises:

determining a position of shoulders of the first user in relation to the head orientation; and using the position of the shoulders of the first user to calculate a depth for the animation of the 3D avatar.

14. The system of claim 9, wherein the second device is an augmented reality (AR) headset, and the additional features comprise AR-specific functionality comprising at least rendering the 3D avatar in a real-world environment as viewed through the AR headset.

15. The system of claim 9, wherein enhancing the animation of the 3D avatar comprises adjusting an appearance and one or more movements of the 3D avatar based on device-specific features of the second device.

16. The system of claim 9, wherein the enhanced animation of the 3D avatar comprises a portion of a call in the virtual experience between the first user and the second user.

17. A non-transitory computer-readable medium with instructions stored thereon that, when executed by a processor, cause the processor to perform operations comprising:

receiving communication inputs from a first device associated with a first user in a virtual experience, the communication inputs comprising at least a video input;

determining facial landmarks and head orientation of the first user based on the communication inputs;

generating an animation of a three-dimensional (3D) avatar of the first user based on the facial landmarks and the head orientation of the first user;

mapping the head orientation of the first user to an orientation of the first device based on one or more of roll, yaw, and pitch of the orientation of the first device;

adjusting a virtual camera position based on the head orientation of the first user, wherein the virtual camera position is a simulated viewpoint within the virtual experience from which a scene that depicts the 3D avatar of the first user is rendered;

receiving communication inputs from a second device associated with a second user in the virtual experience, the second device having additional features not present on the first device, wherein the additional features include hardware capabilities of the second device that are not available on the first device;

enhancing the animation of the 3D avatar based on the communication inputs from the second device; and providing the enhanced animation of the 3D avatar to the second device for display on the second device.

18. The non-transitory computer-readable medium of claim 17, wherein the second device is a virtual reality (VR) headset, and the additional features comprise VR-specific inputs and outputs.

19. The non-transitory computer-readable medium of claim 17, wherein the instructions cause the processor to perform further operations comprising:

receiving a request from the second device to switch from a VR mode to an augmented reality (AR) mode; and adjusting the enhanced animation of the 3D avatar and the virtual camera position based on the AR mode.

20. The non-transitory computer-readable medium of claim 17, wherein the communication inputs from the first device further comprise audio input, and wherein the instructions cause the processor to perform a further operation comprising:

generating facial expressions and mouth movements for the 3D avatar based on the audio input.

* * * * *